(12) United States Patent
Atkins et al.

(10) Patent No.: US 11,845,900 B2
(45) Date of Patent: Dec. 19, 2023

(54) PROCESS FOR THE PREPARATION OF A $C_{20}$ TO $C_{60}$ WAX FROM THE SELECTIVE THERMAL DECOMPOSITION OF PLASTIC POLYOLEFIN POLYMER

(71) Applicant: H&R Internationale Beteiligung GmbH, Hamburg (DE)

(72) Inventors: Martin P. Atkins, Antrim (GB); Fergal Coleman, Antrim (GB)

(73) Assignee: H&R Internationale Beteiligung GmbH, Hamburg (DE)

( * ) Notice: Subject to any disclaimer, the term of this patent is extended or adjusted under 35 U.S.C. 154(b) by 0 days.

(21) Appl. No.: 15/559,478

(22) PCT Filed: Mar. 30, 2017

(86) PCT No.: PCT/GB2017/050900
§ 371 (c)(1),
(2) Date: Sep. 19, 2017

(87) PCT Pub. No.: WO2017/168160
PCT Pub. Date: Oct. 5, 2017

(65) Prior Publication Data
US 2018/0273848 A1    Sep. 27, 2018

(30) Foreign Application Priority Data
Mar. 31, 2016  (GB) ..................... 1605524

(51) Int. Cl.
*C10G 1/10*  (2006.01)
*C10G 1/02*  (2006.01)
*C10B 53/07*  (2006.01)

(52) U.S. Cl.
CPC ............... *C10G 1/10* (2013.01); *C10B 53/07* (2013.01); *C10G 1/02* (2013.01); *Y02P 20/143* (2015.11)

(58) Field of Classification Search
None
See application file for complete search history.

(56) References Cited

U.S. PATENT DOCUMENTS

| 4,740,270 A | 4/1988 | Roy |
|---|---|---|
| 5,087,436 A | 2/1992 | Roy |

(Continued)

FOREIGN PATENT DOCUMENTS

| CA | 2822678 | 2/2014 |
|---|---|---|
| CN | 102504330 | 6/2012 |

(Continued)

OTHER PUBLICATIONS

Notification of Transmittal of the International Search Report and The Written Opinion of the International Searching Authority—dated Jun. 7, 2017.

(Continued)

*Primary Examiner* — Youngsul Jeong
(74) *Attorney, Agent, or Firm* — Ryan T. Grace; Advent, LLP

(57) ABSTRACT

The present invention relates to a process for the preparation of a $C_{20}$ to $C_{60}$ wax from the thermal decomposition of plastic polymer. The present invention provides a vacuum pyrolysis process for preparing a $C_{20}$ to $C_{60}$ wax from the thermal decomposition of plastic polyolefin polymer, the method comprising the steps of: i) introducing plastic polyolefin polymer into a thermal reaction zone of a vacuum pyrolysis reactor; ii) heating the plastic polyolefin polymer at sub-atmospheric pressure, wherein the temperature in the thermal reaction zone of the reactor is from 500° C. to 750° C., to induce thermal decomposition of the plastic polyolefin polymer and to form a thermal decomposition product effluent which comprises a major portion by weight of a $C_{20}$ to $C_{60}$ wax fraction; and iii) condensing a vapour component of the thermal decomposition product effluent from the (Continued)

Figure 1:
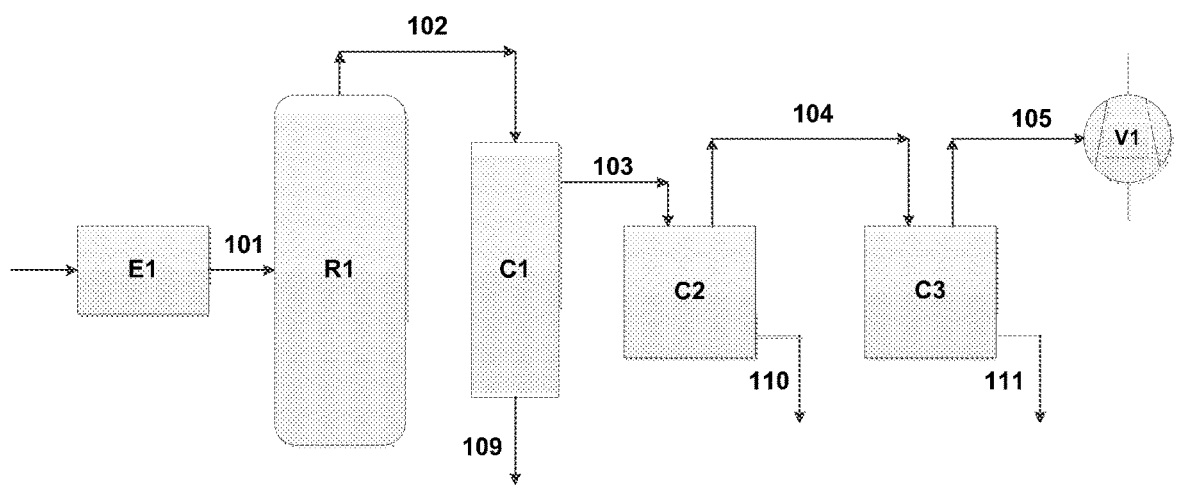

vacuum pyrolysis reactor in a multistage condensation comprising a plurality of condensation stages connected in series.

20 Claims, 6 Drawing Sheets

(56) References Cited

U.S. PATENT DOCUMENTS

| | | | |
|---|---|---|---|
| 6,143,940 A | 11/2000 | Miller et al. | |
| 6,150,577 A | 11/2000 | Miller et al. | |
| 6,822,126 B2 * | 11/2004 | Miller | C10G 1/00 |
| | | | 208/18 |
| 8,420,875 B1 | 4/2013 | Mackay et al. | |
| 2009/0007484 A1 * | 1/2009 | Smith | C10B 47/44 |
| | | | 44/606 |
| 2009/0170739 A1 | 7/2009 | Miller | |
| 2012/0032009 A1 * | 2/2012 | Flores | B03B 5/28 |
| | | | 241/24.28 |
| 2012/0184787 A1 * | 7/2012 | Miller | C10G 45/64 |
| | | | 585/1 |
| 2014/0046102 A1 | 2/2014 | D'Amato et al. | |
| 2014/0352204 A1 * | 12/2014 | Belanger | B01D 5/0057 |
| | | | 44/307 |

FOREIGN PATENT DOCUMENTS

| | | |
|---|---|---|
| CN | 103756007 | 4/2014 |
| DE | 19512029 | 11/1996 |
| DE | 19702539 | 7/1998 |
| DE | 10013466 | 9/2001 |
| EP | 2135923 A1 | 12/2009 |
| WO | 2010049824 | 5/2010 |
| WO | 20140125345 | 8/2014 |

OTHER PUBLICATIONS

GB Search Report dated Sep. 6, 2016.
GB Search Report dated Oct. 2, 2017.
Miranda R. et al., "Vacuum pyrolysis of commingled plastics containing PVC II. Product analysis", Polymer Degradation and Stability, Barking, GB, vol. 73, No. 1, Jan. 1, 2001, pp. 47-67, XP004241971.
Office Action in Europe for Application No. 17715990.2, dated Dec. 19, 2022.

* cited by examiner

PROCESS FOR THE PREPARATION OF A $C_{20}$ TO $C_{60}$ WAX FROM THE SELECTIVE THERMAL DECOMPOSITION OF PLASTIC POLYOLEFIN POLYMER

The present invention relates to a process for the preparation of a $C_{20}$ to $C_{60}$ wax from the thermal decomposition of plastic polymer. In particular, the present invention corresponds to a vacuum pyrolysis process which is operated under conditions favourable for the formation of a $C_{20}$ to $C_{60}$ wax.

As levels of waste plastic continue to rise globally, there has become an increasing focus on plastics recycling solutions as an alternative to landfill. Plastic recycling has historically been focused on producing fuel oil and gas products, although conversion of waste plastics into waxes, lubricants and grease base stocks is also possible. There remains a strong market for waxes as a result of a diverse range of possible applications including, for example, use in adhesives, candles, building materials, electrical insulation materials, paper and cardboard surface treatments as well as in paints and other coatings. Waxes may also be readily converted into lubricant oils which are of particular value to the automotive industry. Thus, given the healthy demand for waxes, it would be advantageous to recycle the large volumes of waste plastic that continue to be generated in order to prepare waxes which are of significant commercial value.

Pyrolysis is a well-known thermochemical decomposition process which occurs in the absence of oxygen. Historically, pyrolysis has been used as a means for conversion of organic material into higher value decomposition products. Common examples include conversion of lignocellulosic biomass into bio-oil and the recycling of used rubber tyres into fuel oil and gas products. Pyrolysis has also been used as a means for converting waste plastic into wax and other higher value decomposition products.

A number of different processes and reactor designs have been investigated for the pyrolysis of waste plastics, including processes utilising melting vessels, blast furnaces, autoclaves, tube reactors, rotary kilns, cooking chambers and fluidized bed reactors. Much of the focus regarding waste plastics pyrolysis has been directed to fluidised bed processes. Fluidized bed reactors have been popular as they provide rapid heat transfer, good control for pyrolysis reaction and vapour residence time, extensive high surface area contact between fluid and solid per unit bed volume, good thermal transport inside the system and high relative velocity between the fluid and solid phase, as well as an ease of use. For these reasons, fluidized-bed reactors can also be operated so as to provide so called "fast pyrolysis" conditions, characterised by very high heating and heat transfer rates and low vapour residence times in the thermal decomposition zone of the pyrolysis reactor which is intended to minimise secondary cracking reactions in the reactor.

EP 0502618 discloses a process for pyrolysing polyolefins in a fluidised bed of particulate material (e.g. quartz sand) and with a fluidising gas at a temperature of from 300 to 690° C., preferably without a catalyst and at atmospheric pressure. The pyrolysis products comprise lower hydrocarbons, preferably in the range of around $C_7$ to $C_{70}$. EP 0 567 292 relates to a similar fluidised bed process but is conducted at higher pressures and in the presence of an acidic catalyst such as an alumina or zeolite catalyst.

EP 0577279 discloses the use of a toroidal fluidised bed reactor in place of a conventional fluidised bed. A larger size range of particulate bed materials can be used with this process and low residence times can be implemented. At 350° C., in a bed of alumina, a mixture of hydrocarbons was formed by pyrolysis of polyethylene, mainly having 30 to 40 carbon atoms. At 500° C., and using a zirconia bed, the result was mainly 40 to 80 carbon atoms.

EP 0687692 discloses another fluidised bed process with the addition of "guard beds" comprising CaO to remove HCl from the product before further processing. This process can be used with "mixed waste plastic" which includes, for instance, PVC. Pre-conditioning can include heating at 250 to 450° C. in a stirred tank or extruder. It is also disclosed to introduce liquid (molten) hydrocarbons (from the fluidised bed, or refinery streams) to the feedstock in order to further crack these hydrocarbons and to reduce viscosity/improve heat transfer.

EP 0620264 discloses a fluidized-bed pyrolysis process, wherein a wax product is subsequently hydrotreated to remove double-bonds and heteroatoms after pyrolysis, before being isomerised and fractionated to give a lubricating oil.

Other processes for conversion of waste plastics have focused on catalytic depolymerisation, an example of which is disclosed in WO 2014/110664. In that process, a preheated molten polymeric material, such as polyethylene, is heated in a high pressure reactor in the presence of [Fe—Cu—Mo—P]/$Al_2C_3$ catalyst in order to produce the desired wax product.

DE 100 13 466 discloses a process for recovery of high molecular weight polyolefin decomposition wax from recycled plastics. In that process, waste plastics are melted at temperatures ranging from 350° C. to 390° C. before the melted plastic is thermally decomposed at temperatures up to 450° C. in the absence of oxygen. Distillation, preferably under vacuum, is then undertaken to isolate the desired high molecular weight fraction. This document teaches the use of melting followed by pyrolysis at temperatures of up to a maximum of 450° C. and under the pressure generated by the reaction. There is no suggestion of reducing the pressure at which pyrolysis is conducted in this document. However, such a reduction would also be expected to reduce the heating requirement of the pyrolysis reaction in order to achieve the same level of cracking, since the boiling point of the polyolefin material is reduced at lower pressure.

An alternative pyrolysis process that has been used in connection with the thermal decomposition of biomass is vacuum pyrolysis. This process obviates the use of a carrier gas which is required in other pyrolysis processes. Carrier gas can entrain fine char particles produced from decomposition of biomass in the reactor, which are subsequently collected with the oil when it condenses; impacting negatively upon bio-oil quality. Vacuum pyrolysis can therefore help improve bio-oil quality by reducing entrainment of fine char particles. The vacuum pyrolysis process can also accommodate larger feed particles than conventional fluidized bed processes.

The heat transfer rates in vacuum pyrolysis are typically lower compared with fluidised bed processes and other pyrolysis technologies and on this basis vacuum pyrolysis is generally considered to correspond to a so called "slow pyrolysis" process, characterised by relatively slow heating rates (approximately 0.1-1° C./s) as opposed to a so called "fast pyrolysis" process characterised by fast heating rates (approximately 10-200° C./s). Nevertheless, the produced pyrolysis vapours are quickly removed from the vacuum pyrolysis reactor as a result of the vacuum, thereby reducing secondary cracking reactions. Consequently, vacuum pyrolysis may also be considered to simulate a "fast pyrolysis" process at least to this extent. Such a process is, for example, disclosed in CA 1,163,595 which describes vacuum pyrolysis of lignocellulosic materials to afford organic products and liquid fuels. An overview of fast pyrolysis of biomass is also provided in Bridgewater A. V. et al., Organic Geochemistry, 30, 1999, pages 1479 to 1493.

There remains a need for alternative pyrolysis processes which are advantageous for the thermal decomposition of plastic polymer, especially where a wax pyrolysis product can be prepared in high yield.

It has now been found that the simulated fast pyrolysis conditions of vacuum pyrolysis may be applied advantageously to the selective thermal decomposition of waste plastic for production of $C_{20}$ to $C_{60}$ wax. In particular, the present invention utilises a vacuum pyrolysis process with a multistage downstream condensation, the combination of which has been found to minimise secondary cracking reactions both in and outside the reactor thereby helping to maximise yield of a $C_{20}$ to $C_{60}$ wax product. Numerous additional advantages of the process of the present invention will be apparent from the below disclosure.

By employing a vacuum pyrolysis process in the thermal decomposition of plastic polymer in accordance with the present invention, rather than a conventional high-pressure fluidized-bed pyrolysis process, it is possible to obtain $C_{20}$ to $C_{60}$ wax of particularly desirable composition and in good yield. The process of the invention may be used to obtain a synthetic wax having desirable properties such as favourable melting, congealing, and drop points, as well as favourable viscosity, density, and needle penetration.

A benefit of the present invention is that it simulates a fast pyrolysis process so as to minimise secondary cracking reactions in the pyrolysis reactor, which has been found to be beneficial for maximising $C_{20}$ to $C_{60}$ wax yield, yet does not have the energy demand associated with the relatively high heating rates utilised, for instance, in fluidized-bed fast pyrolysis processes. In other words, the present invention can represent an economical solution to obtaining a selective thermal decomposition of plastic polymer so as to produce a high value wax pyrolysis product in good yield. The process of the present invention does not require the use of a catalyst, a carrier gas or a fluidized-bed which typically requires intermittent regeneration, maintenance and repair to maintain adequate functionality.

Furthermore, the multistage condensation utilised for condensing the pyrolysis effluent has been found to be advantageous for minimising secondary cracking reactions whilst the step-wise cooling associated with the multistage condensation corresponds to an economical use of cooling, as well as a means for separation of some lighter boiling point fractions from the condensate comprising the $C_{20}$ to $C_{60}$ wax product.

Thus, in one aspect the present invention provides a vacuum pyrolysis process for preparing a $C_{20}$ to $C_{60}$ wax from the thermal decomposition of plastic polyolefin polymer, the method comprising the steps of:
  i) introducing plastic polyolefin polymer into a thermal reaction zone of a vacuum pyrolysis reactor;
  ii) heating the plastic polyolefin polymer at sub-atmospheric pressure, wherein the temperature in the thermal reaction zone of the reactor is from 500° C. to 750° C., to induce thermal decomposition of the plastic polyolefin polymer and to form a thermal decomposition product effluent which comprises a major portion by weight of a $C_{20}$ to $C_{60}$ wax fraction; and
  iii) condensing a vapour component of the thermal decomposition product effluent from the vacuum pyrolysis reactor in a multistage condensation comprising a plurality of condensation stages connected in series.

A plastic polyolefin polymer is employed for thermal decomposition in accordance with the present invention and is intended to include any suitable thermoplastic polymer preparable from the polymerisation of a simple olefin monomer. Examples include polyethylene (PE), polypropylene (PP), polymethylpentene (PMP), polybutene-1 (PB-1), as well as copolymers thereof.

Preferably, the plastic polyolefin polymer employed as the feed in accordance with the present invention comprises or consists essentially of used or waste plastic. Nevertheless, in some embodiments the plastic polyolefin polymer employed as the feed may include virgin plastic, or may even consist essentially of virgin plastic.

In addition to polyolefins, common sources of waste plastic material include: aromatic plastic polymers, for example polystyrene; halogenated plastic polymers, for example polyvinyl chloride and polytetraflouroethylene; and polyester plastic polymers, for example polyethylene terephthalate. It is preferred that these plastic polymers are kept to a minimum in the feed which is subjected to pyrolysis in the process of the present invention. The presence of appreciable quantities of these polymers can complicate system design and feasibility. For example, these polymers can lead to gum formation necessitating regular reactor shut-down and cleaning steps to be implemented. Halogenated polymers also give rise to the formation of haloacids following pyrolysis which can lead to significant corrosion problems unless steps are taken to neutralise or otherwise trap the acid byproducts.

Thus, in preferred embodiments, the feed to the pyrolysis reactor comprises less than 1.0 wt. %, preferably less than 0.1 wt. %, of combined aromatic, halogenated and polyester polymers. Most preferably, the feed to the pyrolysis reactor comprises substantially no aromatic, halogenated and polyester polymers. Where used or waste plastic is used as the source of the plastic polyolefin polymer utilized in the present invention, it will be appreciated that sorting processes are available to substantially eliminate contamination of the waste polyolefin plastic.

The plastic polyolefin polymer used in accordance with the present invention preferably comprises polyethylene, which may be in the form of high-density polyethylene (HDPE), low-density polyethylene (LDPE), linear low density polyethylene (LLDPE) or mixtures thereof.

The plastic polyolefin polymer used in accordance with the present invention may comprise polypropylene, which may be in the form of high-density polypropylene (HDPP), low-density polypropylene (LDPP) or mixtures thereof.

In preferred embodiments, the plastic polyolefin polymer comprises both polyethylene and polypropylene. For example, the plastic polyolefin polymer may comprise polyethylene and polypropylene in a weight ratio of polyethylene to polypropylene of from 30:70 to 90:10. In preferred embodiments, the plastic polyolefin polymer comprises polyethylene and polypropylene in an amount of at least 90 wt. %, more preferably at least 95 wt. %, most preferably at least 97 wt. %.

In particularly preferred embodiments, the weight ratio of polyethylene to polypropylene is from 60:40 to 90:10, more preferably from 65:35 to 85:15, even more preferably from 70:30 to 80:20. It is has been found that a particularly desirable wax may be produced by the vacuum pyrolysis process of the present invention when the plastic polymer feed comprises polyethylene and polypropylene in these preferred weight ratios. In particular, these preferred ratios have been found to afford a wax with particularly favourable properties including melting, congealing, and drop points, as well as favourable viscosity, density, and needle penetration, as compared to other polymer mixtures, including mixtures of polyethylene and polypropylene which do not have these weight ratios.

The beneficial effect of these preferred ratios is believed to be related to the particular olefin versus paraffin content of the wax produced by the process of the present invention, which in turn is also affected by the extent of secondary cracking reactions occurring in the pyrolysis reactor, which are kept to a minimum. The presence of polypropylene ensures that decomposition products obtained therefrom include branching, which can have a significant effect on the physical properties of the wax obtained.

Another benefit associated with the presence of branching relates to downstream processing where the wax product of the process of the present invention is converted into, for instance, a lubricant base stock. In order to improve lubricant properties, including for example reducing pour point and increasing viscosity index, isomerization is typically included to introduce branching. The presence of branching in the wax product of the thermal decomposition (derived, for instance, from the presence of polypropylene in the plastic polyolefin polymer feed) can make the downstream isomerization step less onerous or energy intensive. For example, an isomerization catalyst which has high selectivity for n-paraffins, meaning that there is preference for isomerization of the portion of the wax which requires it, may be advantageously used under energetically favourable conditions which would not be sufficient for the effective conversion of other waxes not containing branching (for example polyethylene or Fischer-Tropsch derived waxes) to lubricant base stocks.

In order to obtain a plastic polyolefin polymer of the desired composition, in preferred embodiments, an optical sorting process is used to select the plastic polyolefin polymer constituents and their relative proportions in the polymer feed. Following intermediate sorting processes which, for instance, separate different plastics based on density or differential buoyancy in air to produce intermediate streams, optical sorting may subsequently be used to further sort the components of a single intermediate stream. Optical sorting is a convenient means for ensuring that the desired ratio of polyethylene to polypropylene in the plastic polyolefin polymer fed to the pyrolysis reactor is maintained in the preferred embodiments of the invention. Optical sorting technologies include near-Infrared (NIR) absorption spectroscopy, camera color sorters and X-ray fluorescence, as for instance described in US 2014/0209514 and U.S. Pat. No. 5,134,291.

In step i) of the process of the invention, the plastic polyolefin polymer is supplied to the thermal reaction zone of the vacuum pyrolysis reactor. The plastic polyolefin polymer may be supplied to the pyrolysis reactor in any form tolerated by the pyrolysis reactor. For example, where the plastic polyolefin polymer is supplied in solid form, this may suitably be in flaked, pelletized or granular form. However, it is preferred that the plastic polyolefin polymer is supplied to the pyrolysis reactor in molten form following a pre-heating step.

The plastic polyolefin polymer may be introduced into the pyrolysis reactor by any suitable means, although preferably a means which is compatible with supplying a vacuum pyrolysis reactor during operation under sub-atmospheric conditions, potentially on a continuous basis. In preferred embodiments, an extruder is used for feeding the plastic polyolefin polymer to the pyrolysis reactor. Examples of suitable extruders include single or twin screw type, although single screw is preferred. Where the plastic polyolefin polymer is supplied to the pyrolysis reactor in molten form, the extruder may be heated such that the plastic is melted during extrusion.

Thus, in the process of the present invention plastic polyolefin polymer may be supplied to the extruder from a hopper, for instance in flaked, pelletized or granular form, after which it comes into contact with the rotating screw which forces the plastic polyolefin polymer along the barrel of the extruder, which in preferred embodiments is heated. The plastic polyolefin polymer is subsequently forced through a feed pipe connected to the inlet of the pyrolysis reactor which allows the extruded plastic to be introduced to the thermal reaction zone of the reactor. In preferred embodiments, the extruder is connected to the pyrolysis reactor via a shut-off valve which intermittently allows feed to enter.

The reactor used in the process of the present invention is a vacuum pyrolysis reactor, which may be of any suitable form provided it may be operated under sub-atmospheric conditions. As will be appreciated by the skilled person, operating at a vacuum requires certain feed and discharge configurations in order to maintain a good seal at all times, which configurations, and the associated design implications, are well known to the skilled person.

Examples include simple furnace, tank, stirred tank or tube reactors (depending on the scale of the process), as well as moving bed vacuum pyrolysis reactors or stirred bed vacuum pyrolysis reactors. As will be appreciated by the skilled person, stirred tank moving and stirred bed configurations complicate reactor design and increase capital costs associated with the pyrolysis process. Consequently, simple tank reactors may be preferred from a cost perspective.

Vacuum conditions can be used to decrease the boiling point of components subjected to heating and therefore the vacuum pyrolysis can reduce the heating duty that would otherwise be required for thermal decomposition of the plastic polyolefin polymer. It has been surprisingly found that the nature of the thermal decomposition in the vacuum pyrolysis process of the present invention favours the formation of $C_{20}$ to $C_{60}$ wax. This is believed to be a consequence of the relatively slow heat transfer conditions and short vapour residence times in the reactor associated with the vacuum pyrolysis of the present invention, as well as the nature of the condensation stage which has been found to enhance $C_{20}$ to $C_{60}$ wax yield and the advantageous properties of the wax obtained. These properties include the particular olefin versus paraffin content of the wax produced in step ii) of the process of the present invention, as well as other compositional traits resulting from the extent of cracking reactions occurring in the pyrolysis reactor.

Any suitable temperature and pressure combination may be utilized in the process of the invention in order to produce a $C_{20}$ to $C_{60}$ wax, provided that it is sufficient for thermal decomposition of the polyolefin plastic polymer to produce pyrolysis vapours. The skilled person is able to select suitable temperatures and sub-atmospheric pressures as necessary. For instance, the skilled person will appreciate that at lower pressures, there is a lower heating duty for thermal decomposition, such that lower temperatures in the thermal reaction zone of the pyrolysis reactor are required. Conversely, where higher pressures are used, correspondingly higher temperatures may be required for adequate thermal decomposition over a reasonable timeframe.

Any suitable means of which the person of skill in the art is aware for heating the vacuum pyrolysis reactor may be used in connection with the process of the present invention, for example a burner and/or an induction heater.

Suitably, the temperature within the thermal reaction zone of the vacuum pyrolysis reactor is from 500° C. to 750° C. Preferably the temperature within the thermal reaction zone of the vacuum pyrolysis reactor is from 500° C. to 650° C., more preferably 525° C. to 650° C., even more preferably from 550° C. to 650° C., for example from 575° C. to 625° C.

In other examples, the temperature in the thermal reaction zone of the vacuum pyrolysis reactor is greater than 500° C., for example greater than 525° C. or greater than 550° C. In other examples, the temperature in the thermal reaction zone of the vacuum pyrolysis reactor is less than 750° C., for example less than 725° C. or less than 700° C. Suitable pressures within the thermal reaction zone of the vacuum pyrolysis reactor are less than 75 kPa absolute. Preferably, the pressure within the thermal reaction zone of the vacuum pyrolysis reactor is less than 50 kPa absolute, more preferably less than 30 kPa absolute.

It has been found that, by reducing the pressure in the thermal decomposition zone of the pyrolysis reactor, pyrolysis vapour residence time decreases. As a result, fewer secondary cracking reactions are observed and the distribution of constituents of the thermal decomposition product shifts to higher carbon numbers. Similarly, it has also been that, by increasing the temperature in the thermal decomposition zone of the pyrolysis reactor, the distribution of constituents of the thermal decomposition product shifts to higher carbon numbers. This is a consequence of an increase in the volatility of higher boiling (higher carbon number) components inside the pyrolysis reactor as the pyrolysis temperature increases coupled with the low vapour residence time in the pyrolysis reactor, which minimises secondary cracking reactions associated with these higher boiling point components.

The thermal decomposition product effluent produced in accordance with the present invention comprises a vapour component and in some embodiments may consist solely of a vapour component. Nevertheless, as the process of the present invention reduces secondary cracking reactions during the pyrolysis, the products of primary cracking reactions, for instance, may be liquids under the conditions of the pyrolysis. However, such liquid products may be entrained as part of an aerosol (e.g. a mist or a fog) within the pyrolysis vapours, or otherwise mobilized by the pyrolysis vapours, and therefore may be swept out of the pyrolysis reactor along with the pyrolysis vapours by the vacuum. Thus, where reference is made herein to the residence time of pyrolysis vapours in the thermal reaction zone of the reactor, this is also intended to refer to the residence time of an aerosol of liquid thermal decomposition product entrained within pyrolysis vapours, or any other association of liquid thermal decomposition product and pyrolysis vapours where pyrolysis vapours assist in mobilizing liquid thermal decomposition product out of the reactor.

As discussed in hereinbelow, the effect of reducing secondary cracking reactions is also enhanced when a multistage condensation immediately follows the pyrolysis step. The multistage condensation has been found to provide an efficient cooling gradient over the plurality of connected condensation stages, which set-up has been found to be particularly suited to a fast flow of vapours, as in the case of vacuum pyrolysis. The multistage condensation provides effective cooling and condensing of pyrolysis vapours whilst reducing the overall refrigeration power demand associated with the use of only a single condensation unit.

In preferred embodiments, the temperature within the thermal reaction zone of the vacuum pyrolysis reactor is from 600° C. to 750° C. and the pressure within the thermal reaction zone of the vacuum pyrolysis reactor is less than 50 kPa absolute.

In preferred embodiments, the temperature within the thermal reaction zone of the vacuum pyrolysis reactor is from 500° C. to 750° C. and the pressure within the thermal reaction zone of the vacuum pyrolysis reactor is less than 30 kPa absolute.

In preferred embodiments, the temperature within the thermal reaction zone of the vacuum pyrolysis reactor is from 500° C. to 750° C. and the pressure within the thermal reaction zone of the vacuum pyrolysis reactor is less than 10 kPa absolute.

Under these preferred pyrolysis conditions, it is has been found that the process of the present invention is particularly advantageous in terms of the yield and quality of the $C_{20}$ to $C_{60}$ wax fraction that may be produced. In this case, the residence time of the pyrolysis vapours in the thermal decomposition zone of the reactor is particularly short (for example, 1 to 5 seconds). As the skilled person will appreciate, vapour residence time in a vacuum pyrolysis reactor may be determined from knowledge of the rate constant for the pyrolysis reaction and based on gas flow meter measurements at the reactor outlet. The benefits of operating under these conditions are enhanced by the multistage condensation step of the process, which preferably includes only two or three condensation stages connected in series having successively lower temperature, discussed in more detail below.

In step iii) of the process, pyrolysis vapours produced in the pyrolysis reactor are condensed to afford the condensed product of the pyrolysis reaction. It has been found to be beneficial to $C_{20}$ to $C_{60}$ wax condensate isolation and yield if a multistage condensation of the pyrolysis vapours is undertaken. This can help to minimise secondary cracking reactions. This is believed to be because there is more efficient cooling and condensing of the pyrolysis vapours over the cooling gradient established by the series of condensation stages than, for instance, in the case where only a single condensation unit is utilised. The pyrolysis vapours flow relatively quickly through the system, as would be expected in the case of a fast pyrolysis process, as a result of the vacuum. The presence of a plurality of condensation stages has been found to be particularly suited for cooling the fast flowing vapours and enhancing the beneficial effects of the pyrolysis in terms of composition and yield of the wax product. Furthermore, the multistage condensation has been found to be more economical in terms of cooling power expended during the condensation than single unit condensation processes.

It has also been found that at higher pyrolysis temperatures, for example temperatures of 500° C. and above, that, while an increased proportion of $C_{20}$-$C_{60}$ waxes is produced, at the same time a larger proportion of lighter (below around $C_{10}$) hydrocarbons is also produced. By providing a multistage condensation in combination with a higher pyrolysis temperature, e.g. 500° C. to 750° C., improved separation of this increased lighter fraction from the desired heavy wax fraction can be achieved in comparison to a single stage condensation. Therefore, the use of the combination of higher pyrolysis temperatures and multistage condensation for the production and separation of the desirable wax fractions provides synergistic effects in terms of yield of the desired $C_{20}$-$C_{60}$ wax fraction. It will be understood that convenient separation of lighter fractions during condensation may simplify or eliminate any downstream distillation requirements.

Reference to a multistage condensation is intended to refer to condensation in which at least two separate condensation stages connected in series are utilised, and where each condensation stage in the series is operated at successively lower temperature (i.e. coolant temperature is lowest at the final condensation stage).

The multistage condensation includes at least two condensation stages connected in series which operate at successively lower temperatures. Preferably, the first condensation stage, which is closest to the pyrolysis reactor, includes a collection vessel for holding condensate formed in the first condensation stage. Alternatively, the first condensation stage may be configured such that liquid condensate as well as residual pyrolysis vapours are passed onto the second condensation stage in the series, which is equipped with a collection vessel to collect condensate from both first and second condensation stages.

At least partial condensation occurs in the first condensation stage before the remaining pyrolysis vapours are passed to the second condensation stage. Preferably, substantially all of the $C_{20}$ to $C_{60}$ wax fraction is collected in a collection vessel of the first condensation stage. The collection vessel of the first condensation stage may include an outlet through which condensate may be conveniently extracted. Typically, the temperature within the first condensation stage is significantly lower than the pyrolysis reactor, but higher than the melting point of the condensate composition so that a flow of liquid condensate to the collection vessel remains possible. The second condensation stage, which is operated at a lower temperature than the first condensation stage, includes a collection vessel for collection of condensate, including condensate formed in the first condensation stage in some embodiments. The collection vessel of the second condensation stage may include an outlet through which condensate may be conveniently extracted. In some embodiments, the second condensation stage is the final condensation stage of the series. The final condensation stage is intended to condense substantially all remaining pyrolysis vapours which comprise primarily low boiling components. Thus, the final condensation stage may act as a cold trap which reduces or substantially eliminates pyrolysis vapours contacting the vacuum pump located downstream.

As will be appreciated by the skilled person, additional condensation stages may be included such that more than two condensation stages connected in series are integrated. For example, additional condensation stages may be included between the first and final condensation stages with the intention of separating mid-boiling point fractions of the condensate. In this way, a fractional condensation process may be utilised. Thus, in some embodiments, the multistage condensation consists of three, four, or even five condensation stages connected in series. Nevertheless, in preferred embodiments, the multistage condensation used in the process of the present invention consists of two or three condensation stages only, most preferably only two condensation stages.

In embodiments where more than two condensation stages are connected in series, the second condensation stage is connected to a third condensation stage which is operated at an even lower temperature than the second condensation stage. The third condensation stage may also include an outlet through which condensate may be conveniently extracted.

Any suitable condensation apparatus known to the skilled person which may be used under sub-atmospheric conditions may be utilised for the individual condensation stages in the multistage condensation of the present invention. Examples of suitable condensation stages include liquid-cooled surface condensers, which may be operated in transverse, parallel or counter flow. Other condensation stages may be configured as quench units, for example a demister quench unit or quench tower. In preferred embodiments, the first condensation stage corresponds to a demister quench unit or quench tower.

In some embodiments, such quench units or towers may be operated with a direct liquid quench in which a liquid coolant contacts the thermal decomposition product directly. Suitable coolant liquids for this purpose include liquid propane and supercritical carbon dioxide. When a direct liquid quench is used, the coolant liquid may be conveniently separated from the thermal decomposition product by lowering pressure to boil off the coolant, which may then be captured for recycle. Direct liquid quench is advantageous for rapidly condensing the thermal decomposition product so as to minimise secondary cracking reactions. Consequently, where a direct liquid quench is employed, this is preferably as part of the first condensation stage.

In some embodiments, the temperature of the coolant liquid associated with the first stage may be from 65° C. to 120° C., for example from 75° C. to 100° C., or from 85° C. to 95° C. As will be appreciated by the skilled person, a temperature gradient will exist over the flow path through the condensation stage which differs from the temperature of the coolant. Nevertheless, the degree of cooling within the first stage is to the extent that at least partial condensation of pyrolysis vapours occurs.

In some embodiments, the temperature of the coolant liquid(s) associated with the second and any optional additional intermediate condensation stages, may be from 0° C. to 65° C., for example from 25° C. to 50° C., or from 35° C. to 45° C.

In some embodiments, the temperature of the coolant liquid associated with the last condensation stage may be from −200° C. to 25° C., for example −80° C. to 15° C. or −25° C. to 10° C.

In other embodiments, lower temperatures are used in connection with the first and second condensation stages. For example, in some embodiments, the temperature of the coolant liquid associated with the first condensation stage may be from −20° C. to 50° C., for example from −15° C. to 30° C., or from −10° C. to 10° C. In some embodiments, the temperature of the coolant liquid(s) associated with the second and any optional additional intermediate condensation stages, may be from −30° C. to 10° C., for example from −25° C. to 0° C., or from −20° C. to −10° C. As will be appreciated, lower temperatures in the condensation stages are however associated with higher energy costs.

As will be appreciated by the skilled person, the coolant liquid used at each condensation stage will depend on the temperature at which the coolant is intended to be operated, which may be optimised for the particular conditions of the process, for example reactor temperature and system pressure. Examples of suitable coolants include water or aqueous coolants, hydrocarbon-based coolants, for example propane or glycol, or inorganic coolants such as liquid nitrogen. The skilled person is able to select an appropriate coolant depending on the desired temperature of operation, or indeed if a direct liquid quench is utilised. For example, glycol or liquid nitrogen may be utilized for the cold trap of the final condensation stage, if desired and suitable for the scale of the process.

Any suitable vacuum pump may be used in connection with the process of the present invention. An example of such a pump includes an oil pump. In order to avoid damage to the pump used in the process of the invention, where haloacids are produced during the pyrolysis as a result of the presence of a minor amount of halogenated polymers in the feed, a calcium oxide guard bed may be used upstream of the vacuum pump.

Following the multistage condensation step of the process of the present invention, a condensate is typically obtained comprising a major portion of $C_{20}$ to $C_{60}$ wax, typically together with an amount of a lighter diesel fraction. Thus, the process of the present invention may further comprise a step iv) of fractionating the thermal decomposition product effluent (i.e. the liquid/condensed portion of the thermal decomposition product effluent) in order to obtain a $C_{20}$ to $C_{60}$ wax fraction substantially free of lighter and/or heavier thermal decomposition products. As the skilled person will be aware, the fractionation may, for instance, be undertaken in a flash vessel operating under reduced pressure or a distillation column. The distillation column may be a conventional distillation column with a number of stages (e.g. ideal stages) commensurate with the separation desired, for example between about 5 and about 50 ideal separation stages.

Lighter fractions, for instance including the diesel fraction, obtained from the fractionation step may be used as a fuel source for the pyrolysis reactor. Where fractionation of the condensed product of the invention containing $C_{20}$ to $C_{60}$ wax affords a fraction containing a major portion of heavier (i.e. larger carbon number) components, this fraction may be recycled to the vacuum pyrolysis reactor for further thermal decomposition.

It will be appreciated that by including a multistage condensation as previously described, the convenient separation of lighter fractions during condensation may simplify or eliminate these distillation requirements. Nonetheless, it will be understood that lighter fractions separated during the condensation may also be used as a fuel source for the pyrolysis reactor or heavier fractions from the condensation could be recycled to the pyrolysis reactor.

By means of the process of the present invention, it is possible to obtain the $C_{20}$ to $C_{60}$ wax fraction as the major portion of the total effluent from the pyrolysis reactor. As the skilled person will appreciate, a major portion is intended to refer to over 50 wt. % of the effluent from the pyrolysis reactor. In preferred embodiments, the $C_{20}$ to $C_{60}$ wax product represents over 55 wt. %, more preferably over 60 wt. %, even more preferably over 65 wt. %, still more preferably over 70 wt. % of the total effluent from the pyrolysis reactor.

The $C_{20}$ to $C_{60}$ wax fraction produced by the process of the present invention typically comprises a mixture of olefins and n-/iso-parrafins. In some embodiments, the $C_{20}$ to $C_{60}$ wax fraction comprises from 20 wt. % to 80 wt. % olefins, preferably from 40 wt. % to 70 wt. % olefins, more preferably from 45 to 65 wt. % olefins. These ranges may apply to the content of 1-olefins, or the combined amount of all olefins present, preferably to the content of 1-olefins only. The $C_{20}$ to $C_{60}$ wax fraction of the present invention may include a higher olefin content than would be expected from the pyrolysis of plastic polyolefin polymer due to the reduction in the level of secondary cracking reactions occurring during the process of the present invention. Thus, there is an increased likelihood of thermal decomposition leading to cracking which does not eliminate the presence of double bonds in the carbon chains of the product compared to alternative processes.

In some embodiments, the $C_{20}$ to $C_{60}$ wax fraction of the process of the invention comprises at least 50 wt. %, preferably at least 75 wt. %, more preferably at least 85 wt. %, even more preferably at least 90 wt. % of a $C_{25}$ to $C_{55}$ wax sub-fraction.

In some embodiments, the $C_{20}$ to $C_{60}$ wax fraction of the process of the invention comprises at least 50 wt. %, preferably at least 75 wt. %, more preferably at least 85 wt. %, even more preferably at least 90 wt. % of a $C_{25}$ to $C_{50}$ wax sub-fraction.

In some embodiments, the $C_{20}$ to $C_{60}$ wax fraction of the process of the invention comprises at least 50 wt. %, preferably at least 75 wt. %, more preferably at least 85 wt. %, even more preferably at least 90 wt. % of a $C_{30}$ to $C_{45}$ wax sub-fraction.

In other embodiments, the $C_{20}$ to $C_{60}$ wax fraction of the process of the invention comprises at least 50 wt. %, preferably at least 75 wt. %, more preferably at least 90 wt. %, even more preferably at least 90 wt. % of a $C_{30}$ to $C_{40}$ wax sub-fraction.

In other embodiments, the $C_{20}$ to $C_{60}$ wax fraction of the process of the invention comprises at least 50 wt. %, preferably at least 75 wt. %, more preferably at least 85 wt. %, even more preferably at least 90 wt. % of a $C_{30}$ to $C_{35}$ wax sub-fraction.

As described herein before, the $C_{20}$ to $C_{60}$ wax fraction of the process of the invention has been found to have particularly beneficial properties, including melting, congealing, and drop points, as well as favourable viscosity, density, and needle penetration. In particular, the $C_{20}$ to $C_{60}$ wax fraction of the invention has generally been found to have superior properties to synthetic waxes, for example Fischer-Tropsch waxes.

It has also been surprisingly found that the benefits of the process of the invention in terms of the properties of the $C_{20}$ to $C_{60}$ wax fraction obtained are even further enhanced when a particular composition of plastic polyolefin polymer is used for thermal decomposition. In particular, in preferred embodiments where a combination of polyethylene and polypropylene is used as the plastic polyolefin polymer, specifically where the weight ratio of polyethylene to polypropylene is from 60:40 to 90:10, preferably from 65:35 to 85:15, more preferably from 70:30 to 80:20, it is has been found that a superior wax product is obtainable.

In particular, it has been surprisingly found that increasing pyrolysis temperature has a greater effect on the proportion of $C_{20}$-$C_{60}$ wax produced for polypropylene and polyethylene/polypropylene mixed feeds than for a pure polyethylene polymer feed. In particular, increasing pyrolysis temperature, for instance at 500° C. and above, can lead to a greater increase in the yield of $C_{20}$-$C_{60}$ wax for a pure polypropylene or mixed polyethylene/polypropylene feed than when compared to the effect of the same pyrolysis temperature increase in the case of pure polyethylene feed. Thus, by using a mixed feed comprising polypropylene and polyethylene, the benefits of operating the pyrolysis at high temperature, for example temperatures above 500° C., in terms of the $C_{20}$-$C_{60}$ fraction yield may be obtained whilst also at the same time retaining the benefits of including some branching in the waxes, as discussed hereinbefore. Thus, for producing waxes with desirable properties, the synergy between the use of a certain proportion of polypropylene in the feed, particularly in the ranges described hereinbefore, and the use of higher pyrolysis temperatures can be particularly advantageous.

In preferred embodiments, the melt point of the $C_{20}$ to $C_{60}$ wax fraction which is obtained from the process of the present invention is from 45 to 80° C., more preferably from 60 to 75° C. The melt point may suitably be determined by ASTM Method D87. Alternatively, where the $C_{20}$ to $C_{60}$ wax fraction does not show a characteristic melting plateau, the drop melt point of the $C_{20}$ to $C_{60}$ wax fraction which is obtained from the process of the present invention is from 45 to 80° C., more preferably from 50 to 70° C. Drop melt point may suitably be determined by ASTM Method D127.

In preferred embodiments, the congealing point of the $C_{20}$ to $C_{60}$ wax fraction obtained by the process of the present invention is from 35 to 65° C. The congealing point measures when a wax ceases to flow and may suitably be determined by ASTM Method D938.

In preferred embodiments, the needle penetration at 25° C. of the $C_{20}$ to $C_{60}$ wax fraction obtained by the process of the present invention is from 40 to 100, preferably from 50 to 80. The needle penetration measures the hardness of the wax and may suitably be determined by ASTM Method D1321.

In preferred embodiments, the kinematic viscosity at 100° C. of the $C_{20}$ to $C_{60}$ wax fraction obtained by the process of the present invention is from 3 to 10 mm²/s (3 to 10 cSt). Kinematic viscosity represents the resistance to flow of a molten wax at the test temperature and may suitably be measured by ASTM Method D445.

Waxes obtained from the pyrolysis of plastic polyolefin polymers typically comprise more double bonds than, for instance, polyolefin waxes formed by high-pressure polymerisation. Determination of the type and level of double bonds in the wax product may be undertaken, for instance, by infrared analysis. Meanwhile average olefin content of the wax may be determined from a combination of NMR analysis and simulated distillation (SimDist) GC. Bromine number may also be measured to determine olefinicity, in accordance with ASTM D1159.

The wax product of the process of the present invention may undergo further treatment depending on the desired end use. The wax product of the process of the present invention has a number of different uses including: fillers in pigment master batches; rub resistance and slip agents in printing inks; additives for paints and coating for increasing scratch resistance; as lubricants and release agents in molding; as components of polishes and varnishes; as hotmelt coatings; as hydrophobic components of corrosion protectants; in toner preparations; as components of insulating materials; and in candles. The wax product of the present invention may also be conveniently converted into a lubricant base stock.

Where wax products are obtained from conventional biomass pyrolysis, subsequent conversion of the wax to a lubricant base stock requires a hydrotreatment followed by isomerization. Hydrotreatment removes heteroatoms such as N, S and O, which are undesirable in the lubricant base stock since they normally give rise to colour instability, and eliminates double bonds. Meanwhile, isomerization selectively transforms linear paraffins to multi-branched isoparaffins, which improves lubricant properties such as pour point and viscosity index.

It will be appreciated that where a mixed feed comprising polypropylene is used the increase in the amount of branching in the waxes obtained from the pyrolysis reaction can make the isomerization step less energy intensive, i.e. such that the isomerization may be conducted at a lower temperature than is typically used. For example, the isomerization reaction may be conducted at a temperature of from 200° C. to 400° C., preferably from 200° C. to 300° C.

Furthermore, the increase in the amount of branching in the waxes obtained from the pyrolysis reaction can reduce the hydrogen consumption during hydroisomerization. In this way, the hydrogen to liquid wax ratio may be lower than is typically used, as a result of a lower hydrogen demand, allowing for a more efficient hydroisomerization process. For example, the hydrogen-containing gas feed rate to the hydroisomerization reactor may suitably be such that the hydrogen to liquid wax ratio is from 100 to 1,750 m³/m³, preferably from 100 to 700 m³/m³, and more preferably from 150 to 600 m³/m³, for example 175 to 450 m³/m³.

As will be appreciated, in addition to increasing the efficiency of the hydroisomerization step, lubricant base stocks produced by hydroisomerization of the waxes obtained according to embodiments of the present invention have desirable properties such as improved pour point and viscosity index. Lubricant base stocks produced from waxes obtained according to embodiments of the present invention also display favourable Noack volatility.

The presence of heteroatoms in wax products obtained from conventional biomass pyrolysis is derived, for instance, from the oxygen atoms incorporated in the lignocellulosic constituents of the biomass and so these must be removed as part of the conversion process. Wax products derived from natural petroleum sources also contain quantities of sulphur and nitrogen compounds which are known to contribute to the deactivation of wax hydroisomerization catalysts. To prevent this deactivation, it is preferred that the wax feed to the hydroisomerization reaction contain less than 10 ppmw sulphur, preferably less than 5 ppmw sulphur and less than 2 ppmw nitrogen, preferably less than 1 ppmw nitrogen.

In contrast, the wax product obtained from the thermal decomposition of plastic polyolefin polymer in accordance with the present invention is substantially free of heteroatoms and therefore hydrotreatments for removing heteroatoms may be rendered completely redundant. As will be appreciated, the process of the present invention does not require the presence of biomass in the plastic polyolefin polymer feed, and it is preferred that co-processing of plastic polyolefin polymer and biomass is not conducted as part of the process of the present invention. Thus, use of the wax product obtained from the process of the present invention may obviate conventional hydrotreating processes and make the conversion of the wax into a lubricant base stock more efficient. As the skilled person will appreciate, content of heteroatoms in the wax may be verified by GC-NPD or chemiluminescence.

Lubricant base stocks may be classified as Group I, II, III, IV and V base stocks according to API standard 1509, "ENGINE OIL LICENSING AND CERTIFICATION SYSTEM", September 2012 version 17$^{th}$ edition Appendix E, as set out in the table below:

| Group | Saturated hydrocarbon content (% by weight) ASTM D2007 | Sulphur content (% by weight) ASTM D2622 or D4294 or D4927 or D3120 | Viscosity Index ASTM D2270 |
|---|---|---|---|
| I | <90 and/or | >0.03 and | ≥80 and <120 |

| Group | Saturated hydrocarbon content (% by weight) ASTM D2007 | | Sulphur content (% by weight) ASTM D2622 or D4294 or D4927 or D3120 | | Viscosity Index ASTM D2270 |
|---|---|---|---|---|---|
| II | ≥90 | and | ≤0.03 | and | ≥80 and <120 |
| III | ≥90 | and | ≤0.03 | and | ≥120 |
| IV | | | polyalphaolefins | | |
| V | | | all base stocks not in Groups I, II, III or IV | | |

Preferably, the lubricant base stock preparable from the wax product of the present invention is a Group III/Group III+ base oil. As the skilled person will appreciate, Group III+ base oils correspond to Group III base oils with particularly high viscosity index (for example, at least 135 as measured by ASTM D2270).

Figure 2:
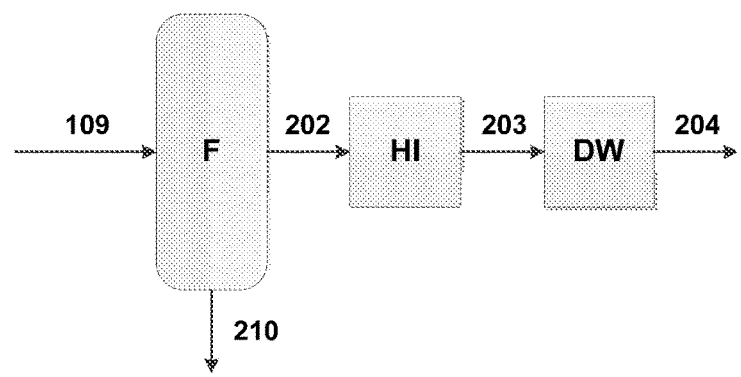
Figure 3:
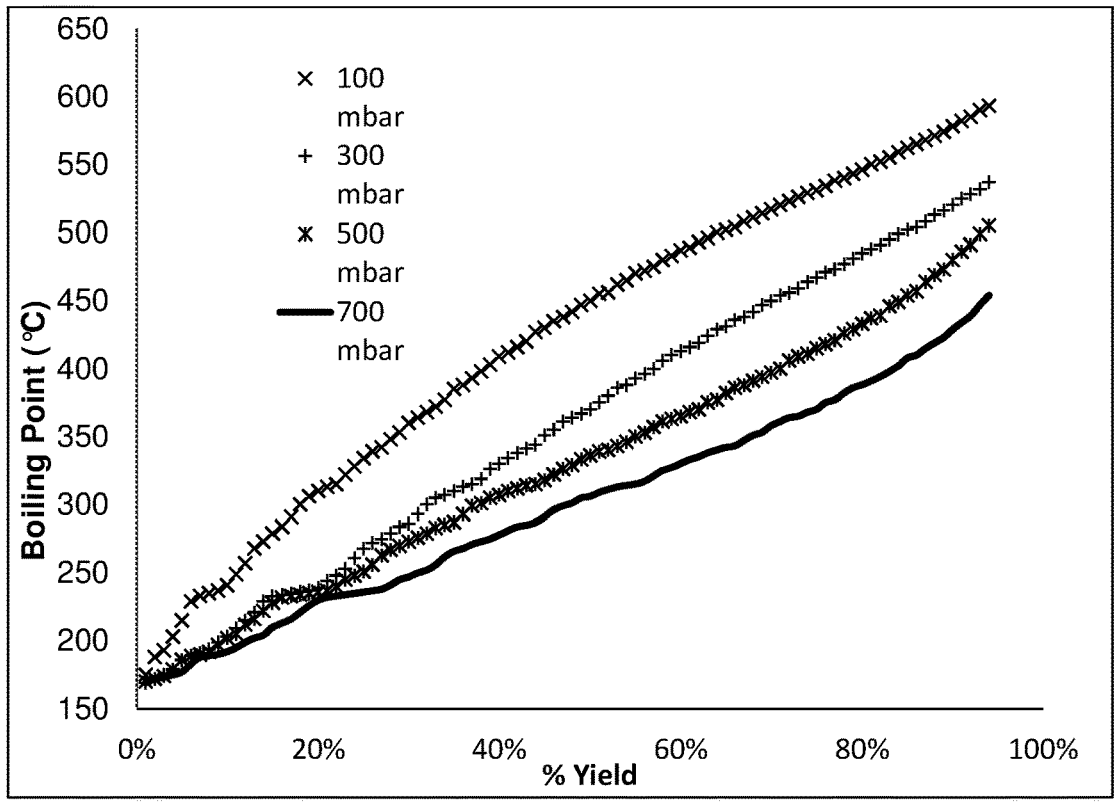
Figure 4:
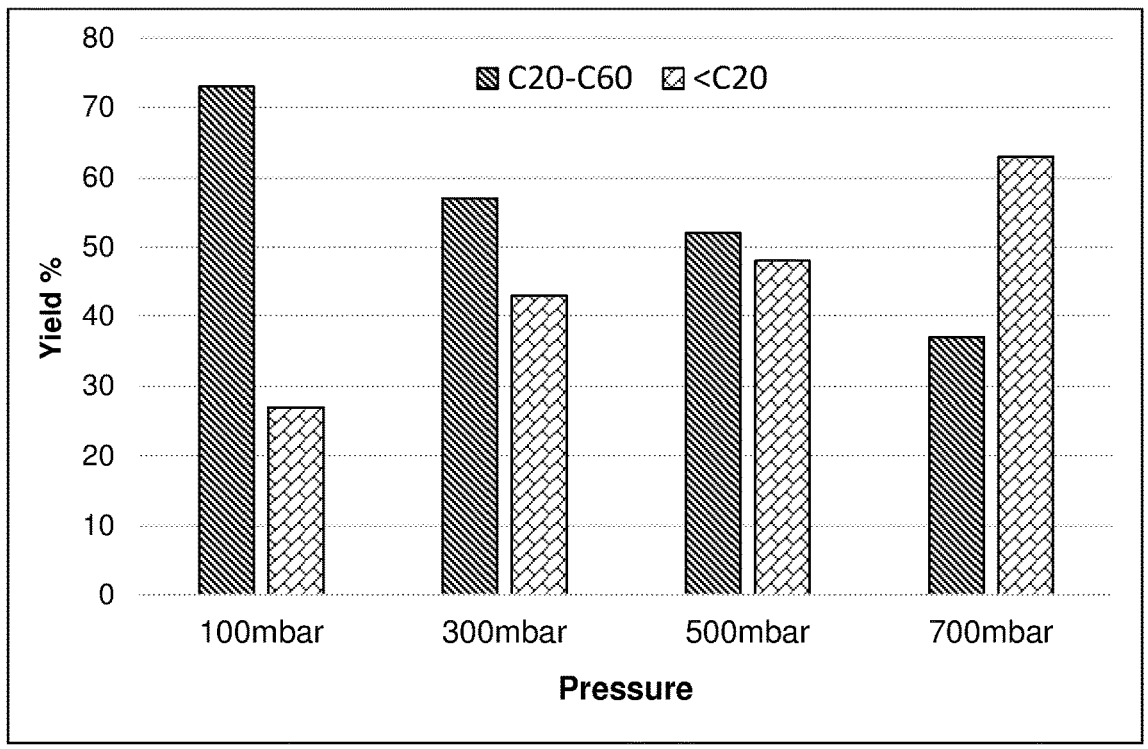
Figure 5:
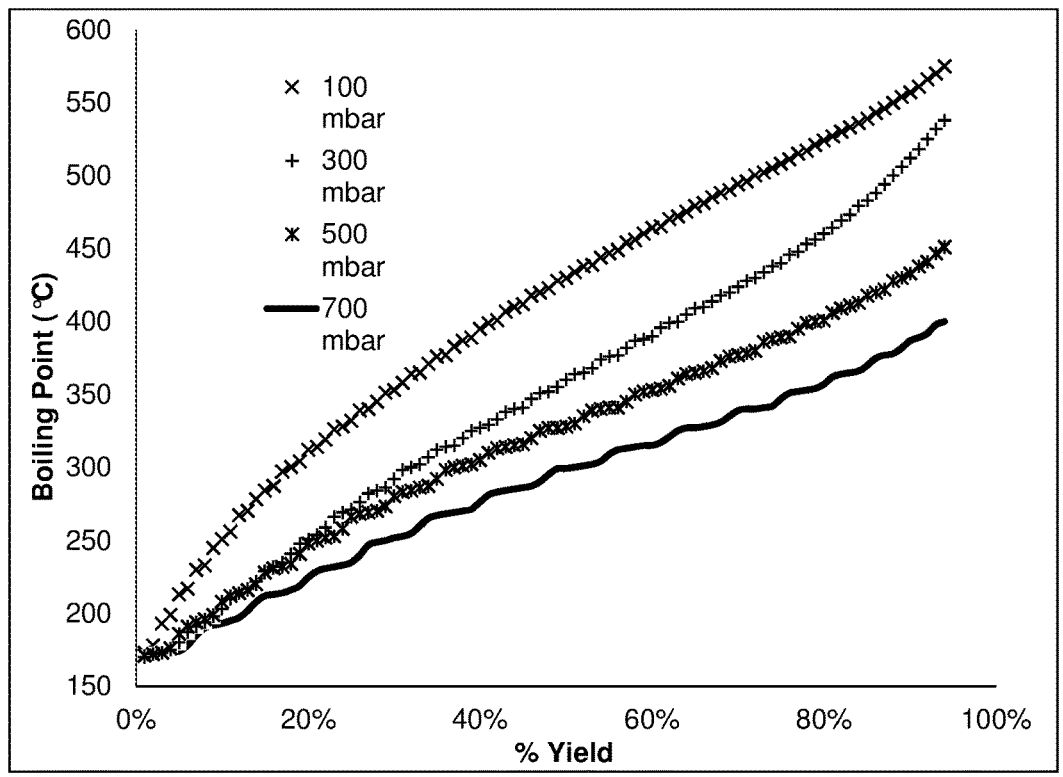
Figure 6:
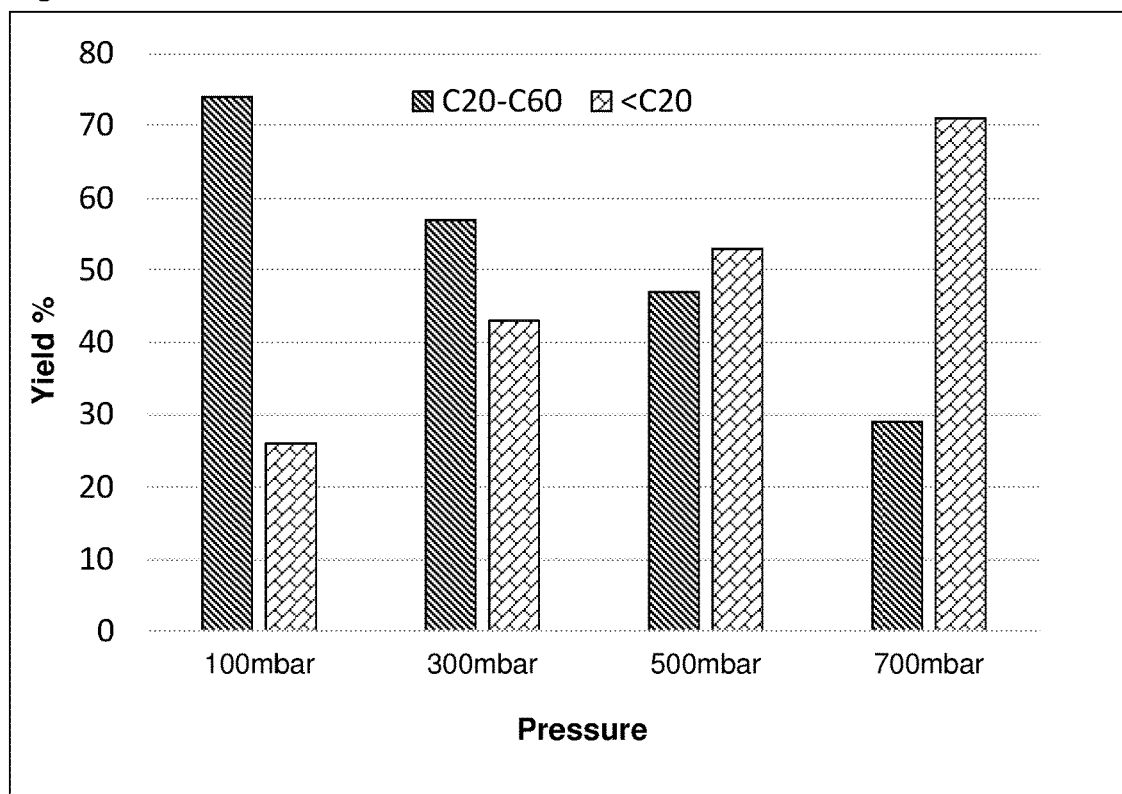
Figure 7:
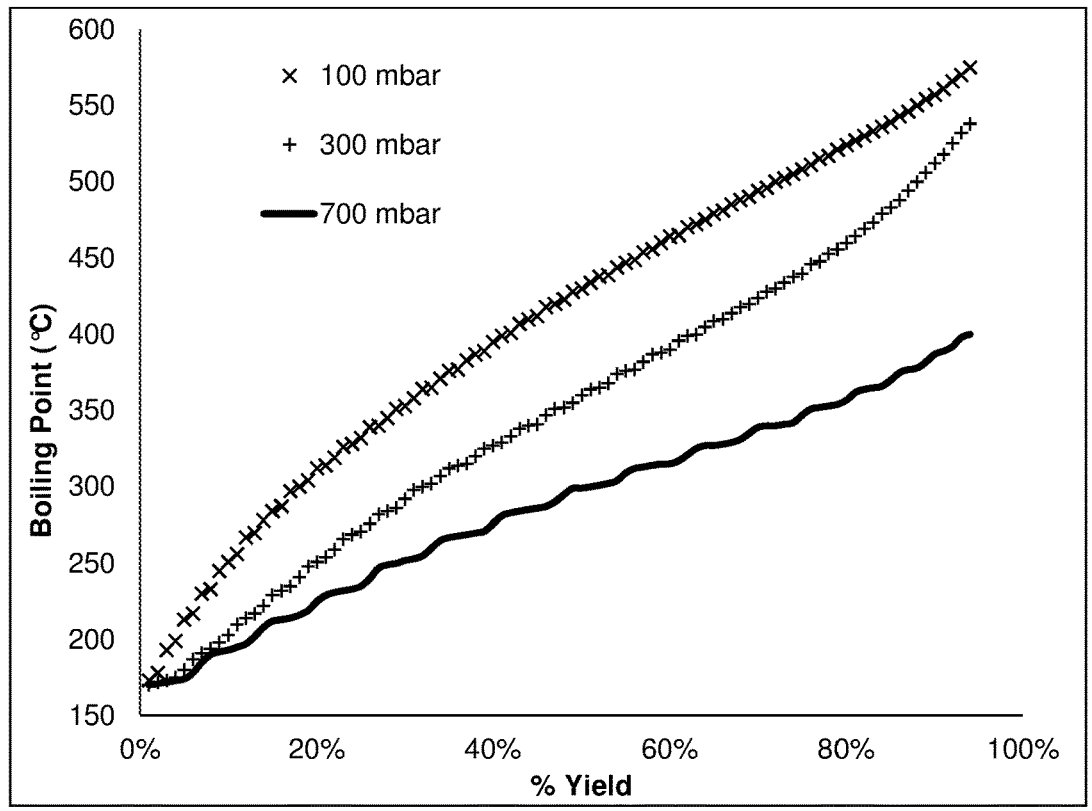
Figure 8:
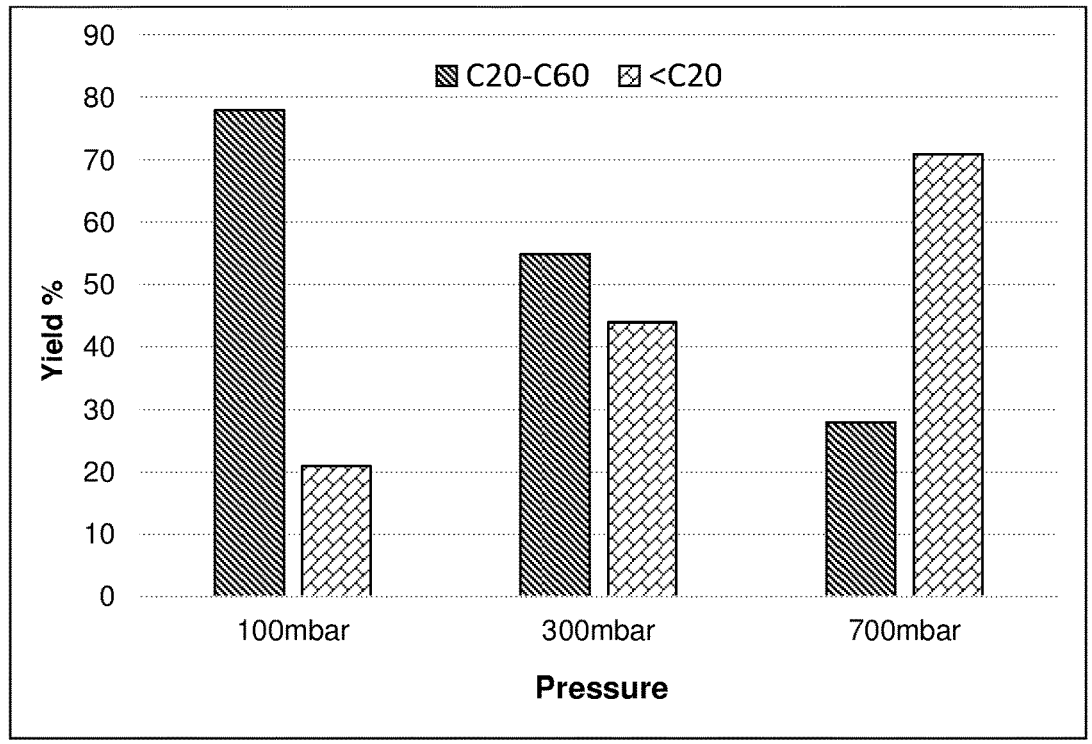
Figure 9:
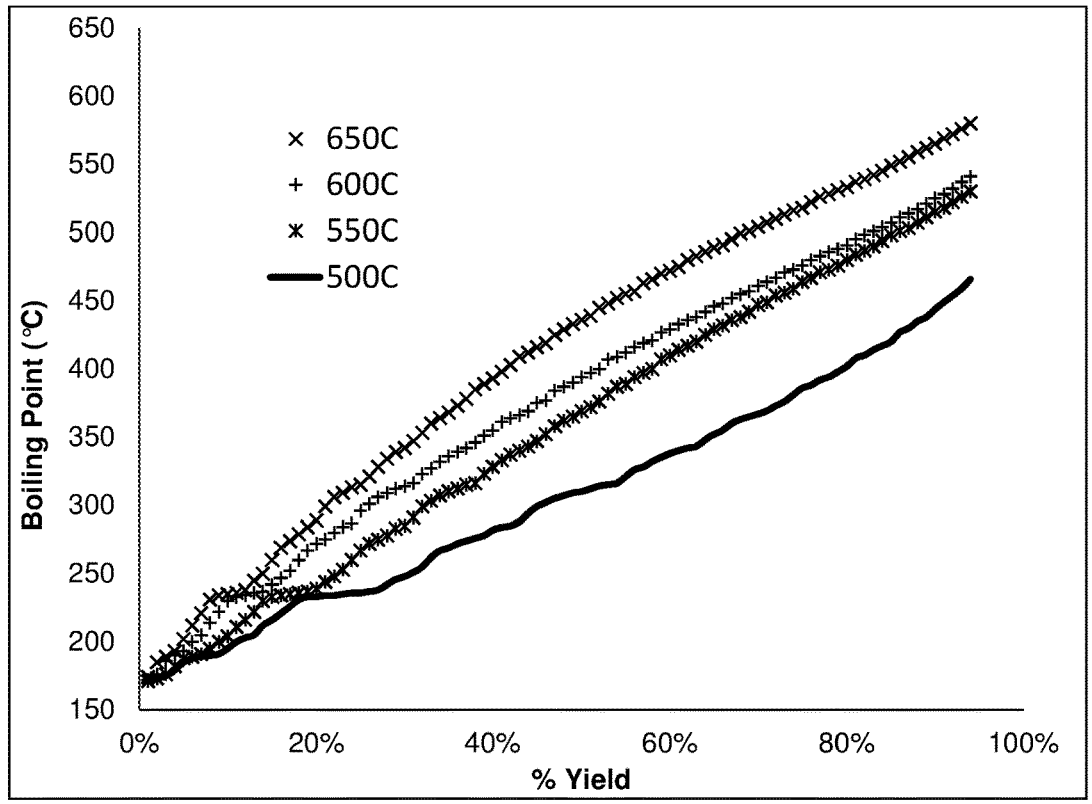
Figure 10:
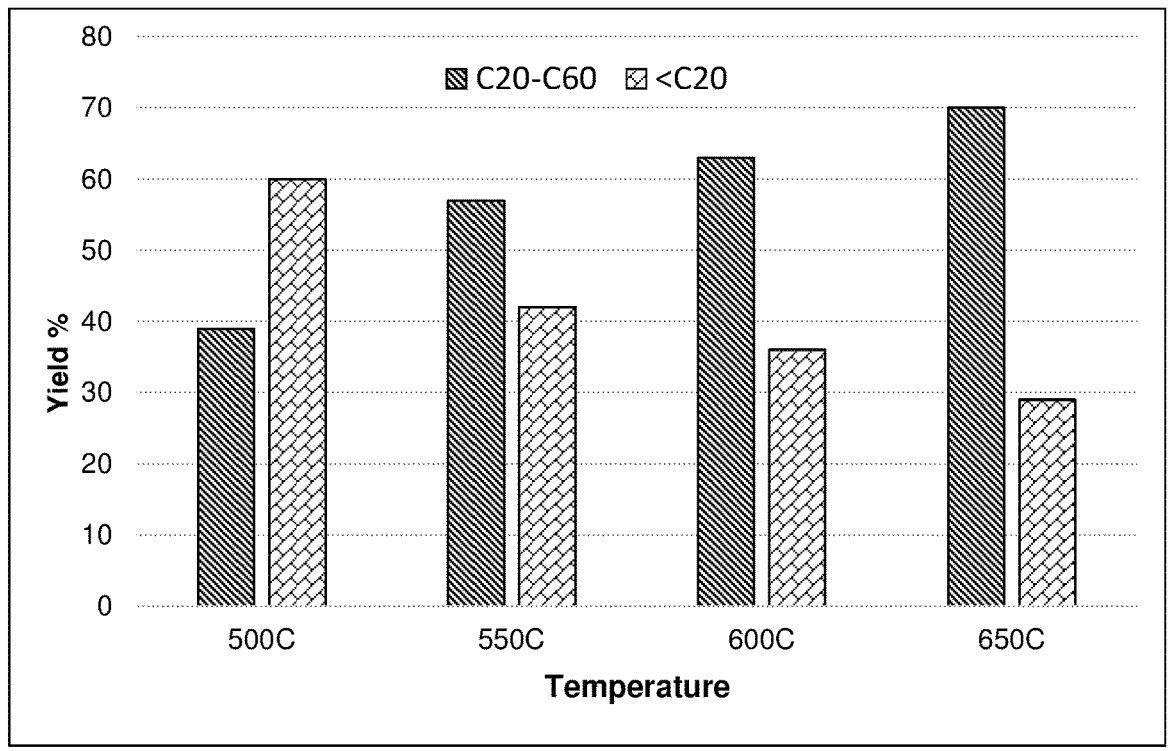
Figure 11:
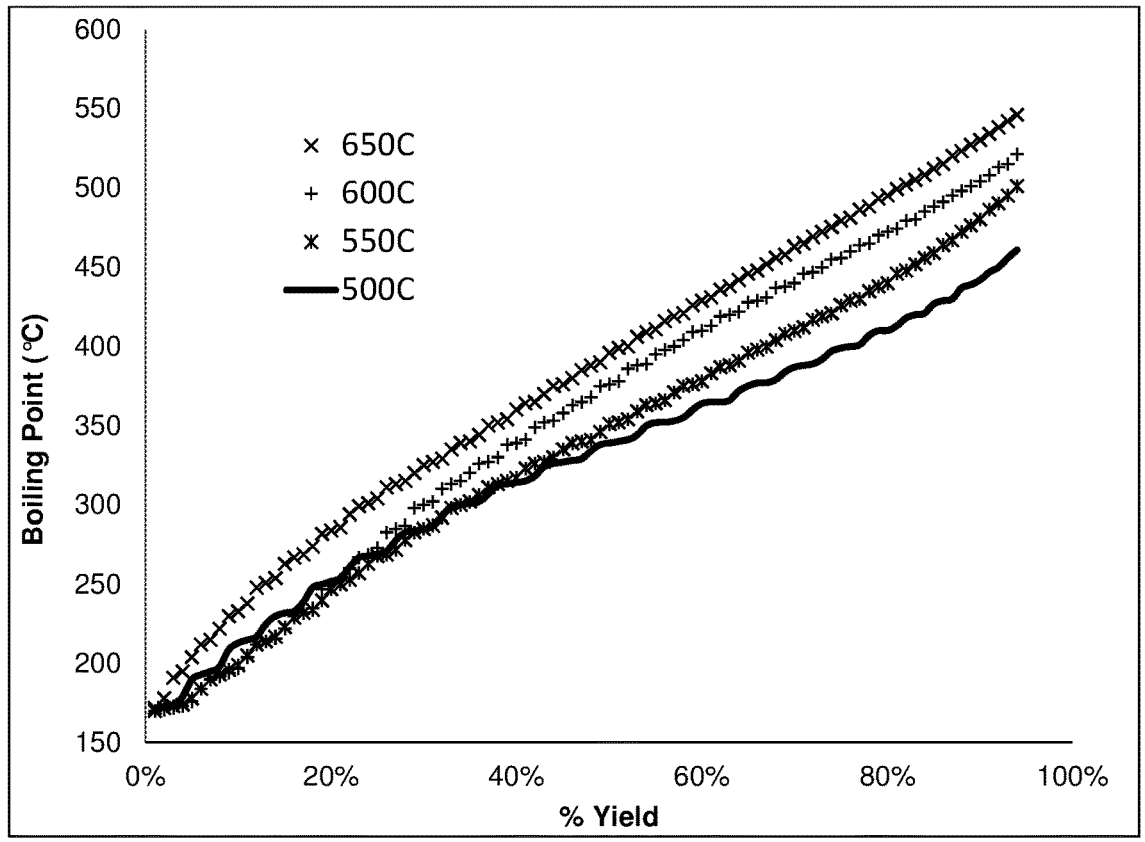
Figure 12:
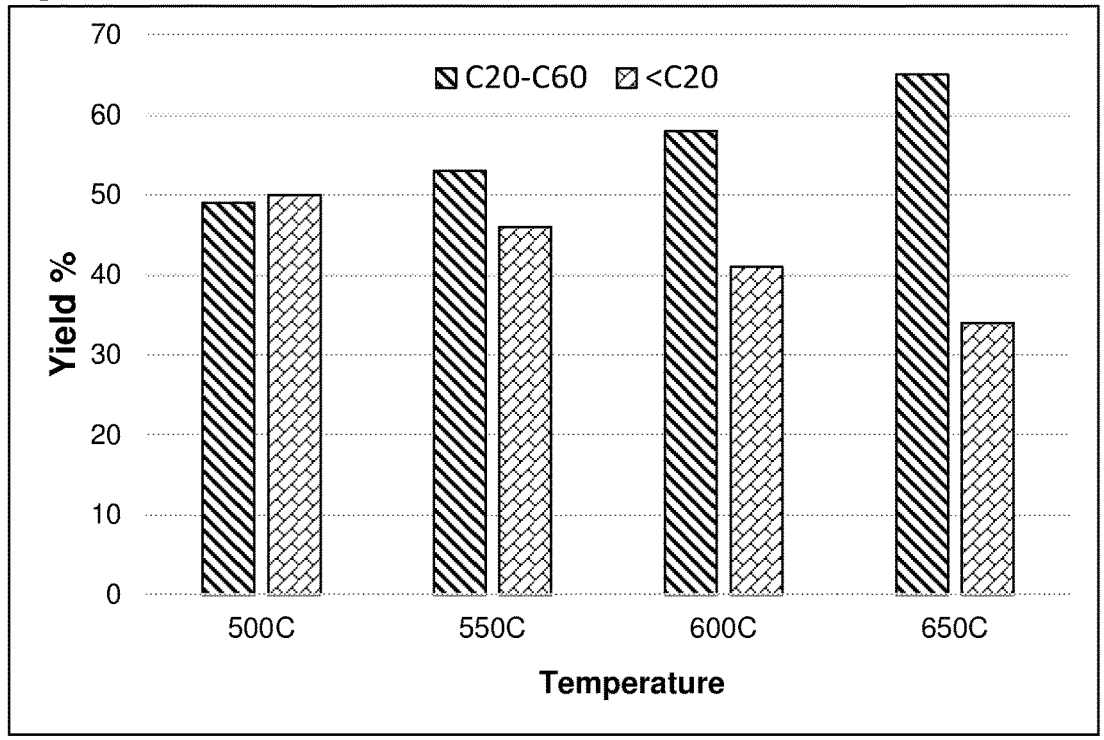

The present invention will now be illustrated by way of the following examples and with reference to the following figures, wherein:

FIG. 1: shows a schematic diagram of a vacuum pyrolysis process for producing a $C_{20}$ to $C_{60}$ wax as part of the process of the present invention;

FIG. 2: shows a schematic diagram showing fractionation and downstream processing of the $C_{20}$ to $C_{60}$ wax to produce a lubricant base stock;

FIG. 3: shows a plot illustrating the effect of pressure in the pyrolysis reactor on the thermal decomposition product distribution from pyrolysis of polypropylene in terms of boiling point of constituents;

FIG. 4: shows a bar graph illustrating the effect of pressure in the pyrolysis reactor in the pyrolysis of polypropylene on the $C_{20}$ to $C_{60}$ fraction yield;

FIG. 5: shows a plot illustrating the effect of pressure in the pyrolysis reactor on the thermal decomposition product distribution from pyrolysis of polyethylene in terms of boiling point of constituents;

FIG. 6: shows a bar graph illustrating the effect of pressure in the pyrolysis reactor in the pyrolysis of polyethylene on the $C_{20}$ to $C_{60}$ fraction yield;

FIG. 7: shows a plot illustrating the effect of pressure in the pyrolysis reactor on the thermal decomposition product distribution from pyrolysis of a polyethylene/polypropylene blend in terms of boiling point of constituents;

FIG. 8: shows a bar graph illustrating the effect of pressure in the pyrolysis reactor in the pyrolysis of a polyethylene/polypropylene blend on the $C_{20}$ to $C_{60}$ fraction yield;

FIG. 9: shows a plot illustrating the effect of temperature in the pyrolysis reactor on the thermal decomposition product distribution from pyrolysis of polypropylene in terms of boiling point of constituents;

FIG. 10: shows a bar graph illustrating the effect of temperature in the pyrolysis reactor in the pyrolysis of polypropylene on the $C_{20}$ to $C_{60}$ fraction yield;

FIG. 11: shows a plot illustrating the effect of temperature in the pyrolysis reactor on the thermal decomposition product distribution from pyrolysis of polyethylene in terms of boiling point of constituents; and FIG. 12: shows a bar graph illustrating the effect of pressure in the pyrolysis reactor in the pyrolysis of polyethylene on the $C_{20}$ to $C_{60}$ fraction yield.

With reference to FIG. 1, a plastic polyolefin polymer is supplied to extruder (E1) from a hopper (not shown). The extruder (E1), which in this instance is heated, produces a molten stream of plastic polyolefin polymer (101) which is fed to a vacuum pyrolysis reactor (R1) and the molten feed enters the thermal decomposition zone of the reactor (R1). The reactor (R1) is operated at sub-atmospheric conditions and at a temperature to give rise to thermal decomposition of the molten plastic polyolefin polymer, thereby producing pyrolysis vapours.

The configuration shown in FIG. 1 includes three condensation stages ($C_1$, $C_2$, $C_3$) exemplifying a fractional condensation process. As will be appreciated, the multistage condensation may be operated with only two condensation stages, or more than three condensation stages, if desired. These pyrolysis vapours produced in the reactor, which may be in the form of an aerosol in which liquid thermal decomposition products are entrained therein, rapidly exit the pyrolysis reactor via an outlet, and the stream of pyrolysis vapours (102) is fed to a first condensation stage ($C_1$). The first condensation stage ($C_1$), which preferably takes the form of a quench tower, is cooled by means of a circulating liquid coolant, for example water, or cooled by direct liquid quench, for example, liquid propane or supercritical $CO_2$.

At least partial condensation of pyrolysis vapours occurs in the first condensation stage ($C_1$), thereby producing an amount of liquid condensate, in addition to any liquid thermal decomposition product already present in the effluent from the reactor. First condensation stage ($C_1$) includes a collection vessel to hold liquid condensate and liquid thermal decomposition product such that substantially only remaining pyrolysis vapours are fed to the second condensation stage ($C_2$) in stream (103). The condensed product may be extracted from the collection vessel of the first condensation stage as stream (109) via an outlet. Stream (109) comprises the $C_{20}$ to $C_{60}$ wax fraction, together with any lighter and/or heavier fractions of the condensed thermal decomposition products. A stream (103), containing remaining pyrolysis vapours, exits the first condensation stage ($C_1$) and is fed to a second condensation stage ($C_2$).

Second condensation stage ($C_2$) condenses pyrolysis vapours that have not been condensed in the first condensation stage ($C_1$). The second condensation stage ($C_2$) is preferably cooled by means of a circulating liquid coolant, for example water, which is at a colder temperature than that of the coolant in the first condensation stage ($C_1$). Condensation of at least a portion of the remaining pyrolysis vapours occurs in the second condensation stage ($C_2$), which may comprise a collection vessel for holding the condensate. The condensed product may be extracted from a collection vessel of the second condensation stage as stream (110) via an outlet. Stream (110) primarily comprises lighter fractions of the condensed thermal decomposition products, for example in the naphtha and/or diesel boiling ranges. This light fraction may be conveniently used as fuel source for heating the pyrolysis reactor.

Remaining pyrolysis vapours are carried in stream (104) and fed to the third and final condensation stage ($C_3$) shown in FIG. 1. However, as the skilled person will be aware, additional condensers can also be integrated into the series of the multistage condensation, which may be of use as a means for improved separation of pyrolysis products as part of a fractional condensation. The third condensation stage ($C_3$) is preferably cooled by means of a circulating liquid coolant, for example water or glycol, which is at a colder temperature than that of the coolant in the second condensation stage ($C_2$), or the preceding condensation stage if more than three condensation stages are used. Condensation of residual pyrolysis vapours occurs in the third condensation stage ($C_3$), which may comprise a collection vessel for holding the condensate. The condensed product may be extracted from a collection vessel of the third condensation stage as stream (111) via an outlet. Stream (111) comprises the lightest fractions of the condensed thermal decomposition products. This lightest fraction may also be conveniently used as fuel source for heating the pyrolysis reactor.

Any non-condensable gas that is present is carried in stream (105) and may ultimately come into contact with variable speed vacuum pump (V). However, as the skilled person will appreciate, the presence of any pyrolysis vapours is preferably kept to a minimum in this stream and preferably completely removed by means of the final condensation stage. Nevertheless, the vacuum may be configured to accommodate various degrees of non-condensable gases being present in the stream which exits the final condensation stage.

FIG. 2 illustrates a possible downstream processing of the wax product of the invention. In particular, the stream (109) is fed to a fractional distillation column (F) where a stream (202) comprising substantially only a $C_{20}$ to $C_{60}$ wax fraction is produced together with a waste stream (210), which may be either used as a fuel source for the pyrolysis reactor or heavier fractions of this stream may be recycled to the pyrolysis reaction. Stream (202), comprising substantially no heteroatoms, is fed to a hydroisomerization reactor (HI) which is operated under hydroisomerization conditions in the presence of hydrogen and a bifunctional hydroisomerization catalyst. A stream (203) comprising a lubricant base stock exits the hydroisomerization reactor (HI), is optionally fractionated (not shown) before being fed into solvent dewaxing unit (DVV) where any residual wax is removed. Product lubricant base stock (204) is thus obtained having both high viscosity index and low pour point which may be blended to form a commercially usable lubricant composition.

EXAMPLES

Preparation of Plastic Feedstock

Pelletized samples of polyethylene (PE) and polypropylene (PP) were obtained from ADN Materials Ltd. In each of the experiments below, samples of PE, PP or a combination thereof were first pre-melted at 400° C. in a quartz tube reaction vessel under atmospheric pressure for at least 10 minutes to provide a homogeneous molten material.

General Vacuum Pyrolysis Method 10 g of molten plastic sample was provided in a quartz tube reaction vessel of 24 mm outer diameter and 150 mm length. The reaction vessel was located inside a Carbolite® tubular furnace of 300 mm length and 25 mm diameter with a borosilicate glass still head fitted to the top of the quartz tube, which was in turn connected to a distillation condenser and 200 ml 2-neck round bottomed cooled collector flask. The distillation condenser was temperature controlled by means of circulating oil at a temperature of 80° C. The collector flask was cooled by acetone/dry ice bath (−78° C.) and connected to Buchi Rotavapor® membrane pump equipped with a digital vacuum controller.

Pyrolysis of the molten plastic sample began after applying the vacuum to establish sub-atmospheric pressure and increasing the heating to pyrolysis temperature. Temperature and pressure conditions were thereafter maintained for one hour, after which the pyrolysis reaction was complete and no further effluent from the reaction vessel was observed. A condensate product was collected in the collector flask comprising the wax product.

Example 1

The above general procedure for pyrolysis was followed for a series of four experiments using 10 g samples of the same propylene feedstock. Pyrolysis temperature was set at 550° C. and four different reaction pressures were adopted: i) 10 kPa; ii) 30 kPa; iii) 50 kPa; and iv) 70 kPa.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 3 whilst the results showing the product distribution based on carbon number are provided in Table A below and represented graphically in FIG. 4.

TABLE A

| Pyrolysis pressure | 10 kPa | 30 kPa | 50 kPa | 70 kPa |
|---|---|---|---|---|
| $C_{20}$-$C_{60}$ (%) | 73 | 57 | 52 | 37 |
| <$C_{20}$ (%) | 27 | 43 | 48 | 63 |

FIG. 3 generally illustrates the trend that as pressure inside the pyrolysis reactor decreases, the boiling point of the constituents of the thermal decomposition product obtained is increased. The results in Table A (as also illustrated in FIG. 4) are consistent in that they show that the amount of higher boiling point $C_{20}$-$C_{60}$ fraction is greatest at lowest pressure. This is believed to relate to lowering of vapour residence time in the pyrolysis reactor as pressure decreases which minimises secondary cracking reactions so that the thermal decomposition product has higher carbon number and therefore higher boiling point.

The results of Example 1 also demonstrate that pressure conditions of the pyrolysis can be adjusted in order to increase the proportion of $C_{20}$-$C_{60}$ wax fraction that is produced.

Example 2

The series of experiments according to Example 1 was repeated except that samples of the same polyethylene feedstock were used in place of polypropylene.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 5 whilst the results showing the product distribution based on carbon number are provided in Table B below and represented graphically in FIG. 6.

TABLE B

| Pyrolysis pressure | 10 kPa | 30 kPa | 50 kPa | 70 kPa |
|---|---|---|---|---|
| $C_{20}$-$C_{60}$ (%) | 74 | 57 | 47 | 29 |
| <$C_{20}$ (%) | 26 | 43 | 53 | 71 |

FIGS. 5 and 6 illustrate the same trends as observed for the polypropylene experiments according to Example 1 and these results also demonstrate that pressure conditions of the pyrolysis can be adjusted in order to increase the proportion of $C_{20}$-$C_{60}$ wax fraction that is produced.

Example 3

The above general procedure for pyrolysis was followed for a series of three experiments using 10 g samples of the same 50:50 mixture by weight of polyethylene and polypropylene feedstock. Pyrolysis temperature was set at 550° C. and three different reaction pressures were adopted: i) 10 kPa; ii) 30 kPa; and iii) 70 kPa.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 7 whilst the results showing the product distribution based on carbon number are provided in Table C below and represented graphically in FIG. 8.

TABLE C

| Pyrolysis pressure | 10 kPa | 30 kPa | 70 kPa |
|---|---|---|---|
| $C_{20}$-$C_{60}$ (%) | 78 | 55 | 28 |
| <$C_{20}$ (%) | 21 | 44 | 71 |

FIGS. 7 and 8 illustrate the same trends as observed for the polypropylene experiments according to Example 1 and the polyethylene experiments of Example 2 and these results also demonstrate that pressure conditions of the pyrolysis can be adjusted in order to increase the proportion of $C_{20}$-$C_{60}$ wax fraction that is produced in a mixed blend of plastic feed.

Example 4

The above general procedure for pyrolysis was followed for a series of four experiments using 10 g samples of the same propylene feedstock. Pyrolysis pressure was set at 30 kPa and four different pyrolysis temperatures were adopted: i) 500° C., ii); 550° C. iii) 600° C., and iv) 650° C.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 9 whilst the results showing the product distribution based on carbon number are provided in Table D below and represented graphically in FIG. 10.

TABLE D

| Pyrolysis Temperature | 500° C. | 550° C. | 600° C. | 650° C. |
|---|---|---|---|---|
| $C_{20}$-$C_{60}$ (%) | 39 | 57 | 63 | 70 |
| <$C_{20}$ (%) | 60 | 42 | 36 | 29 |

FIG. 9 generally illustrates the trend that as temperature inside the pyrolysis reactor increases, the boiling point of the constituents of the thermal decomposition product obtained is increased. The results in Table D (as also illustrated in FIG. 10) are consistent in that they show that the amount of higher boiling point $C_{20}$-$C_{60}$ fraction is greatest at highest temperature. This is a consequence of an increase in the volatility of higher boiling (higher carbon number) components inside the pyrolysis reactor as the pyrolysis temperature increases coupled with the low vapour residence time in the pyrolysis reactor, which minimises secondary cracking reactions associated with these higher boiling point components.

The results of Example 4 also demonstrate that temperature conditions of the pyrolysis can be adjusted in order to increase the proportion of $C_{20}$-$C_{60}$ wax fraction that is produced.

Example 5

The series of experiments according to Example 4 was repeated except that samples of the same polyethylene feedstock were used in place of polypropylene.

The collected effluent from the pyrolysis reaction (excluding uncondensable gases) for each experiment was analysed by SimDist GC chromatography in order to determine the composition of the product according to boiling point and carbon number. The results showing the product distribution based on boiling point are represented graphically in FIG. 11 whilst the results showing the product distribution based on carbon number are provided in Table E below and represented graphically in FIG. 12.

TABLE E

| Pyrolysis Temperature | 500° C. | 550° C. | 600° C. | 650° C. |
|---|---|---|---|---|
| $C_{20}$-$C_{60}$ (%) | 49 | 53 | 58 | 65 |
| <$C_{20}$ (%) | 50 | 46 | 41 | 34 |

FIGS. 11 and 12 illustrate the same trends as observed for the polypropylene experiments according to Example 4 and these results also demonstrate that temperature conditions of the pyrolysis can be adjusted in order to increase the proportion of $C_{20}$-$C_{60}$ wax fraction that is produced.

Comparison of the results in Tables D and E shows that increasing temperature has a greater effect on the proportion of $C_{20}$-$C_{60}$ wax produced for polypropylene (Table D) than for polyethylene (Table E). In this way, by using a mixed feed comprising polypropylene and polyethylene, an increased benefit may be obtained by operating the pyrolysis at high temperature in terms of yield of the $C_{20}$-$C_{60}$ fraction which may be obtained, whilst simultaneously retaining the benefits associated with the properties of the wax resulting from the presence of both polypropylene and polyethylene (e.g. in terms of chain branching and viscosity).

General Vacuum Pyrolysis Method for Scaled-Up Reactions

Pelletized samples of polyethylene (PE) and polypropylene (PP) were obtained from ADN Materials Ltd. as for Examples 1 to 5.

The feedstock material is loaded into a pyrolysis reactor vessel which is then sealed. Nitrogen ($N_2$) gas is used to purge the reactor, before application of a vacuum. Three condensers are set to their respective temperatures. Condenser 1 is cooled using a Julabo with ethylene glycol/water to ca. −10° C. Condenser 2 is cooled using ethylene glycol and dry ice to ca. −15° C. Condenser 3 is cooled using dry ice to −78° C.

The pyrolysis reactor vessel is heated to 275° C., held at this temperature for 1 hour to pre-melt the feedstock before being heated to the desired pyrolysis temperature. The pyrolysis reactor vessel is held at this temperature until the reaction is completed. The reaction was monitored by four temperature probes, three of which are in the reactor vessel and one of which is positioned for measuring the temperature of the vapours coming out of the vessel. The pyrolysis reactor vessel was heated using a heating source comprising 2 heat belts surrounding the vessel. Pyrolysis temperatures referred to hereafter relate to the set temperature of the heating source. Temperature measurements obtained from probes inside the reaction vessel gradually increase to reach the heating source temperature.

In general, the reaction products comprise various hydrocarbon pyrolysis products collected in the condensers, char remaining in the reaction vessel and gases (e.g. hydrocarbons having a boiling point below room temperature), which are too volatile to be collected in the condensers. The products of each reaction in the first condenser were analysed by simulated distillation chromatography (SimDist, ASTM D6352). The products found in condensers 2 and 3 were typically found to be boiling below the minimum observable in the SimDist method, indicating they likely consist of hydrocarbon chains between 5 and 9 carbons in length ($C_5$-$C_9$).

Example 6

The above scaled-up general procedure was followed for two experiments using a 67:33 HDPE:PP by weight feed. Reaction pressure was set at 350 mbar and two different reaction temperatures were adopted: i) 450° C. and ii) 600° C.

The collected effluent from the pyrolysis reaction in the first condenser for each experiment was analysed by SimDist GC chromatography in order to determine the composition of the product according to boiling point and carbon number. The results showing the product distribution in terms of the different fractions collected are shown in Table F below, whilst the results showing the product distribution based on carbon number for the first condenser are provided in Table G below.

TABLE F

|  | 450° C. | | 600° C. | |
| --- | --- | --- | --- | --- |
|  | (kg) | (mass %) | (kg) | (mass %) |
| Feedstock in | 12.00 | 100.00 | 12.00 | 100.00 |
| Condenser 1 | 10.52 | 87.67 | 9.20 | 76.67 |
| Condensers 2 + 3 | 1.19 | 9.92 | 1.51 | 12.58 |
| Char | 0.19 | 1.58 | 0.87 | 7.25 |
| Unaccounted (gases) | 0.10 | 0.83 | 0.42 | 3.50 |

TABLE G

|  | 450° C. (mass %) | 600° C. (mass %) |
| --- | --- | --- |
| $C_{10}$-$C_{25}$ | 67 | 51 |
| $C_{25}$-$C_{31}$ | 13 | 18 |
| $C_{31}$-$C_{36}$ | 8 | 12 |
| $C_{36+}$ | 12 | 19 |
| $C_{20+}$ | 49 | 67 |

The data in Tables F and G illustrate that at higher reaction temperatures an increased proportion of $C_{20+}$ waxes are produced. This is consistent with the data in Tables D and E, which show the same trend. In addition to the increased proportion of heavier waxes at higher temperature, Table F shows that a larger proportion of lighter hydrocarbons collected in the second and third condensers are also produced at 600° C. compared to 450° C. Thus, at higher reaction temperatures, not only are more heavy waxes produced, but there is also a more defined split in the distribution between heavy and light hydrocarbons. This leads to an increase in the amount of product collected in the second and third condensers. In this way, the increased separation provided by a multistage condensation is particularly effective in combination with a higher pyrolysis temperature, i.e. there is a certain synergy between the use of higher pyrolysis temperature and the provision of a multistage condensation in a process for isolating a $C_{20}$-$C_{60}$ wax from the pyrolysis process. It will be understood that convenient separation of lighter fractions during condensation may simplify or eliminate the downstream distillation requirements.

Example 7

The above scaled-up general procedure was followed for two experiments using a pure HDPE feed. Reaction pressure was set at 350 mbar and two different reaction temperatures were adopted: i) 450° C. and ii) 600° C.

The collected effluent from the pyrolysis reaction in the first condenser for each experiment was analysed by SimDist GC chromatography in order to determine the composition of the product according to boiling point and carbon number. The results showing the product distribution based on carbon number for hydrocarbons collected in the first condenser are provided in Table H below.

TABLE H

|  | 450° C. (mass %) | 600° C. (mass %) |
| --- | --- | --- |
| $C_{10}$-$C_{25}$ | 49 | 37 |
| $C_{25}$-$C_{31}$ | 19 | 13 |
| $C_{31}$-$C_{36}$ | 12 | 10 |
| $C_{36+}$ | 20 | 40 |
| $C_{20+}$ | 61 | 69 |

The data in Table H illustrate that at higher reaction temperatures an increased proportion of $C_{20+}$ waxes are produced. This is consistent with the data in Tables D, E and G, which show the same trend.

Furthermore, the data in Table H also show that increasing temperature has a greater effect on the proportion of $C_{20}$-$C_{60}$ wax produced for these polypropylene containing feeds (Tables D and G) than for pure polyethylene feeds (Tables E and H). In this way, by using a mixed feed comprising polypropylene and polyethylene, greater benefits in terms of yield of the $C_{20}$-$C_{60}$ fraction at higher temperature may be obtained whilst also retaining the benefits of having a mixture of polypropylene and polyethylene in the feed in terms of the properties of the resulting wax. Even at temperatures where ultimately less of the $C_{20+}$ fraction is produced for PP containing feeds in comparison to PE feeds, higher temperatures will mitigate the loss whilst retaining the benefits of including some branching in the waxes. Thus, there is a certain synergy between the use of higher pyrolysis temperature and the use of a certain proportion of polypropylene in the feed for isolating a $C_{20}$-$C_{60}$ wax from the pyrolysis process with particularly beneficial properties.

Example 8

The above scaled-up general procedure was followed for three experiments using an 80:20 PE:PP by weight feed. Reaction pressure was set at 350 mbar and three different reaction temperatures were adopted: i) 450° C., ii) 525° C. and iii) 600° C.

The collected effluent from the pyrolysis reaction in the first condenser for each experiment was analysed by SimDist GC chromatography in order to determine the composition of the product according to boiling point and carbon number. The results showing the product distribution in terms of the different fractions collected are shown in Table I below, whilst the results showing the product distribution based on carbon number for the first condenser are provided in Table K below.

TABLE I

|  | 450° C. | | 525° C. | | 600° C. | |
| --- | --- | --- | --- | --- | --- | --- |
|  | (kg) | (mass %) | (kg) | (mass %) | (kg) | (mass %) |
| Feedstock in | 10.015 | 100.00 | 10.000 | 100.00 | 10.010 | 100.00 |
|  | (8.005 + 2.010) |  | (8.000 + 2.000) |  | (8.005 + 2.005) |  |
| Condenser 1 | 7.67 | 76.59 | 7.575 | 75.75 | 7.200 | 71.29 |
| Condenser 2 + 3 | 0.46 | 4.59 | 0.695 | 6.95 | 0.815 | 8.07 |
| Char | 0.25 | 2.50 | 0.11 | 1.1 | 0.210 | 2.08 |
| Unaccounted | 1.635 | 16.33 | 1.62 | 16.2 | 2.21 | 18.56 |

TABLE K

|  | 450° C. (mass %) | 525° C. (mass %) | 600° C. (mass %) |
| --- | --- | --- | --- |
| $C_{10}$-$C_{25}$ | 55 | 55 | 42 |
| $C_{25}$-$C_{31}$ | 18 | 17 | 14 |
| $C_{31}$-$C_{36}$ | 11 | 11 | 16 |
| $C_{36+}$ | 16 | 17 | 28 |
| $C_{20+}$ | 63 | 62 | 69 |

The results in Tables K and I are consistent with the results in Tables F and G, showing that at higher pyrolysis temperatures there are larger proportions of heavier waxes produced, particularly the $C_{36+}$ fraction. As also seen in Table F, Table I also shows an increased amount of product collected in the second and third condensers at higher temperatures, suggesting a certain synergy in the use of a multistage condensation in combination with higher pyrolysis temperatures in obtaining efficient production and separation of the desirable wax fractions.

The invention claimed is:

1. A vacuum pyrolysis process for preparing a $C_{20}$ to $C_{60}$ wax from thermal decomposition of plastic polyolefin polymer, the process operated as a continuous process comprising the steps of:
   i) introducing plastic polyolefin polymer into a thermal reaction zone of a vacuum pyrolysis reactor on a continuous basis;
   ii) heating the plastic polyolefin polymer at sub-atmospheric pressure, wherein a temperature in the thermal reaction zone of the vacuum pyrolysis reactor is from 500° C. to 750° C., to induce the thermal decomposition of the plastic polyolefin polymer and to form a thermal decomposition product effluent which comprises a major portion by weight of a $C_{20}$ to $C_{60}$ wax fraction;
   iii) condensing a vapour component of the thermal decomposition product effluent from the vacuum pyrolysis reactor in a multistage condensation comprising a plurality of condensation stages connected in series, wherein a $C_{20}$ to $C_{60}$ wax fraction having a melt point of from 45° C. to 80° C., a needle penetration at 25° C. of 40 to 100, and a kinematic viscosity at 100° C. of 3 to 10 cSt, is collected in a first condensation stage of the plurality of condensation stages, wherein the first condensation stage is operated at a temperature of from 65° C. to 120° C. and under sub-atmospheric conditions, and wherein at least a portion of the thermal decomposition product effluent is fed to a fractional distillation column; and
   iii-a) extracting a respective plurality of condensed product streams from the plurality of condensation stages.

2. The process according to claim 1, wherein the plastic polyolefin polymer is introduced into the pyrolysis reactor by means of an extruder.

3. The process according to claim 2, wherein the extruder is heated.

4. The process according to claim 2, wherein the plastic polyolefin polymer introduced into to the extruder is at least one member of a group consisting of flaked, pelletized, and granular form.

5. The process according to claim 1, wherein the plastic polyolefin polymer is in molten form when introduced into the thermal reaction zone of the vacuum pyrolysis reactor.

6. The process according to claim 1, wherein the temperature in the thermal reaction zone of the vacuum pyrolysis reactor is from 500° C. to 650° C.

7. The process according to claim 1, wherein the temperature in the thermal reaction zone of the vacuum pyrolysis reactor is from 525 to 650° C.

8. The process according to claim 1, wherein the pressure in the thermal reaction zone of the vacuum pyrolysis reactor is less than 75 kPa absolute.

9. The process according to claim 1 wherein the plastic polyolefin polymer comprises or consists essentially of used or waste plastic.

10. The process according to claim 1, wherein an optical sorting process is utilized to obtain the plastic polyolefin polymer of desired composition.

11. The process according to claim 1, wherein the plastic polyolefin polymer comprises polyethylene.

12. The process according to claim 11, wherein the plastic polyolefin polymer comprises polyethylene and polypropylene.

13. The process according to claim 1, wherein the multistage condensation according to step iii) includes only two condensation stages connected in series, or wherein the multistage condensation according to step iii) corresponds to a fractional condensation and includes at least three stages connected in series.

14. The process according to claim 1, wherein the first condensation stage is operated as a direct liquid quench.

15. The process according to claim 1, wherein a majority of the $C_{20}$ to $C_{60}$ wax fraction is collected in a collection vessel of the first condensation stage.

16. The process according to claim 1, wherein the process further comprises a step iv) of fractionating the thermal decomposition product effluent to obtain a $C_{20}$ to $C_{60}$ wax fraction substantially free of lighter and/or heavier thermal decomposition products.

17. The process according to claim 16, wherein a lighter boiling point fraction separated from the $C_{20}$ to $C_{60}$ wax fraction in step iv) is used as a source of fuel for heating the vacuum pyrolysis reactor.

18. The process according to claim 1, wherein the $C_{20}$ to $C_{60}$ wax fraction comprises a mixture of paraffins and olefins, and/or wherein the $C_{20}$ to $C_{60}$ wax fraction comprises from 20 wt. % to 80 wt. % olefins.

19. The process according to claim 1, wherein the $C_{20}$ to $C_{60}$ wax fraction comprises at least 50 wt. % of a $C_{25}$ to $C_{55}$ wax sub-fraction, and/or wherein the $C_{20}$ to $C_{60}$ wax fraction comprises at least 50 wt. % of a $C_{25}$ to $C_{50}$ wax sub-fraction, and/or wherein the $C_{20}$ to $C_{60}$ wax fraction comprises at least 50 wt. % of a $C_{30}$ to $C_{45}$ wax sub-fraction, and/or wherein the $C_{20}$ to $C_{60}$ wax fraction comprises at least 50 wt. % of a $C_{30}$ to $C_{40}$ wax sub-fraction, and/or wherein the $C_{20}$ to $C_{60}$ wax fraction comprises at least 50 wt. % of a $C_{30}$ to $C_{35}$ wax sub-fraction.

20. The process according to claim 1, wherein the thermal decomposition is conducted in the absence of a catalyst.

\* \* \* \* \*